US012175923B2

(12) United States Patent
Hwang et al.

(10) Patent No.: US 12,175,923 B2
(45) Date of Patent: Dec. 24, 2024

(54) DISPLAY DEVICE AND METHOD FOR DRIVING THE SAME TO CONNECT A FIRST NODE AND A SECOND NODE ACCORDING TO A SENSING ENABLE SIGNAL

(71) Applicant: Samsung Display Co., LTD., Yongin-si (KR)

(72) Inventors: Young Soo Hwang, Yongin-si (KR); Hyung Jin Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/142,502

(22) Filed: May 2, 2023

(65) Prior Publication Data

US 2023/0368725 A1 Nov. 16, 2023

(30) Foreign Application Priority Data

May 10, 2022 (KR) ........................ 10-2022-0056981

(51) Int. Cl.
*G09G 3/32* (2016.01)

(52) U.S. Cl.
CPC ....... *G09G 3/32* (2013.01); *G09G 2300/0426* (2013.01); *G09G 2310/0267* (2013.01); *G09G 2310/0275* (2013.01)

(58) Field of Classification Search
CPC .......... G09G 3/30; G09G 3/32; G09G 3/3208; G09G 3/3216; G09G 3/3222; G09G 3/3225; G09G 3/3233; G09G 3/3241; G09G 3/3258; G09G 3/3266; G09G 3/3275; G09G 3/3283; G09G 3/3291
USPC ...................................................... 345/76–83
See application file for complete search history.

(56) References Cited

U.S. PATENT DOCUMENTS

| | | | | |
|---|---|---|---|---|
| 11,688,344 B2 * | 6/2023 | Shin | G09G 3/3291 345/76 |
| 11,699,395 B2 * | 7/2023 | Baek | G09G 3/3233 345/207 |
| 2012/0161637 A1 * | 6/2012 | Lee | G09G 3/32 315/122 |

(Continued)

FOREIGN PATENT DOCUMENTS

| | | |
|---|---|---|
| KR | 10-2020-0050585 A | 5/2020 |
| KR | 10-2020-0053893 A | 5/2020 |

*Primary Examiner* — Ke Xiao
*Assistant Examiner* — Nelson Lam
(74) *Attorney, Agent, or Firm* — Lewis Roca Rothgerber Christie LLP

(57) ABSTRACT

A display device including a scan line extending in a first direction, a sensing scan line extending in the first direction and spaced from the scan line, a data line extending in a second direction crossing the first direction, a sensing line extending in the second direction and spaced from the data line, a sensing enable signal line extending in the second direction and spaced from the data line and the sensing line, and a sub-pixel connected to the scan line, the sensing scan line, the data line, the sensing line, and the sensing enable signal line. The sub-pixel includes a plurality of light emitting elements between a first node and a second node, a first transistor configured to supply a driving current to the first node according to a voltage of a gate electrode, and a second transistor to control a connection between the first and second nodes.

20 Claims, 18 Drawing Sheets

(56) References Cited

U.S. PATENT DOCUMENTS

| | | | | | |
|---|---|---|---|---|---|
| 2014/0333680 | A1* | 11/2014 | Choi | H05B 45/60 | 315/307 |
| 2016/0012799 | A1* | 1/2016 | Kim | G09G 3/3233 | 345/82 |
| 2016/0163265 | A1* | 6/2016 | Yang | G09G 3/3233 | 345/76 |
| 2019/0147797 | A1* | 5/2019 | Yuan | H10K 59/123 | 345/76 |
| 2021/0056899 | A1* | 2/2021 | Bae | G09G 3/3233 | |

* cited by examiner

DISPLAY DEVICE AND METHOD FOR DRIVING THE SAME TO CONNECT A FIRST NODE AND A SECOND NODE ACCORDING TO A SENSING ENABLE SIGNAL

CROSS-REFERENCE TO RELATED APPLICATION

This application claims priority to and the benefit of Korean Patent Application No. 10-2022-0056981, filed on May 10, 2022, in the Korean Intellectual Property Office (KIPO), the entire content of which is incorporated by reference herein.

BACKGROUND

1. Field

One or more embodiments of the present disclosure relate to a display device and a driving method thereof.

2. Description of the Related Art

As the information society develops, the demand for a display device for displaying an image is increasing in various forms. The display device may be a flat panel display, such as a liquid crystal display, a field emitting display, or a light emitting display panel. The light emitting display device may include an organic light emitting display device including an organic light emitting diode (OLED) element as a light emitting element, or an inorganic light emitting display device including an inorganic light emitting diode element such as a light emitting diode (LED) as a light emitting element.

The light emitting display device compensates for a deviation in a threshold voltage of a driving transistor between pixels by sensing the voltage of the source electrode of the driving transistor. However, when the alignment accuracy of each of the light emitting elements of the pixels is low, the light emitting elements arranged in the reverse direction may exist. An error may occur in a sensing voltage sensed through the sensing line due to a leakage current caused by the light emitting elements arranged in the reverse direction.

SUMMARY

Aspects and features of embodiments of the present disclosure provide a display device capable of preventing an error from occurring in a sensing voltage of a sensing line due to a leakage current caused by light emitting elements arranged in a reverse direction.

Aspects and features of embodiments of the present disclosure provide a method of driving a display device capable of preventing an error from occurring in a sensing voltage of a sensing line due to a leakage current caused by light emitting elements arranged in a reverse direction.

However, embodiments of the present disclosure are not limited to those set forth herein. The above and other embodiments of the present disclosure will become more apparent to one of ordinary skill in the art to which the present disclosure pertains by referencing the detailed description of the present disclosure given below.

According to one or more embodiments of the present disclosure, there is provided a display device including a scan line extending in a first direction, a sensing scan line extending in the first direction and spaced from the scan line, a data line extending in a second direction crossing the first direction, a sensing line extending in the second direction and spaced from the data line, a sensing enable signal line extending in the second direction and spaced from the data line and the sensing line, and a sub-pixel connected to the scan line, the sensing scan line, the data line, the sensing line, and the sensing enable signal line. The sub-pixel includes a plurality of light emitting elements between a first node and a second node, a first transistor configured to supply a driving current to the first node according to a voltage of a gate electrode of the first transistor, and a second transistor configured to control a connection between the first node and the second node according to a sensing enable signal of the sensing enable signal line.

The plurality of light emitting elements may include a first light emitting element including a first electrode connected to the first node and a second electrode connected to the second node, and a second light emitting element including a first electrode connected to the second node and a second electrode connected to the first node.

The plurality of light emitting elements may include a first light emitting element including a first electrode connected to the first node and a second electrode connected to a third node, a second light emitting element including a first electrode connected to the third node and a second electrode connected to the first node, a third light emitting element including a first electrode connected to the third node and a second electrode connected to the second node, and a fourth light emitting element including a first electrode connected to the second node and a second electrode connected to the third node.

The display device may further include a first switch configured to control a connection between a first power voltage and the second node according to a first switch control signal.

The first switch control signal may be an inverted signal of the sensing enable signal.

The display device may further include a second switch configured to control a connection between a sensing power voltage and the second node according to a second switch control signal.

The second switch control signal may be the same as the sensing enable signal.

The sub-pixel may further include a third transistor configured to supply a data voltage of the data line to the gate electrode of the first transistor according to a scan signal of the scan line, a fourth transistor configured to supply an initialization voltage of the sensing line to the first node according to a sensing scan signal of the sensing scan line, and a capacitor between a gate electrode of the first transistor and the first node.

One frame period in a display mode may include a first period and a second period. The scan signal and the sensing scan signal may be generated as a first level voltage during the first period and may be generated as a second level voltage during the second period. The sensing enable signal and the second switch control signal may be generated as the second level voltage during the first period and the second period. The first switch control signal may be generated as the first level voltage during the first period and the second period.

A sensing mode may include a first period, a second period, and a third period. The scan signal and the sensing scan signal may be generated as a first level voltage during the second period, and may be generated as a second level voltage during the first period and the third period. The sensing enable signal and the second switch control signal may be generated as the first level voltage during the first period and the second period. The first switch control signal may be generated as the second level voltage during the first period and the second period.

According to one or more embodiments of the present disclosure, there is provided a display device including a display panel including a sub-pixel connected to a sensing enable signal line, and a circuit board connected to the display panel. The sub-pixel may include a plurality of light emitting elements between a first node and a second node, a first transistor configured to supply a driving current to the first node according to a voltage of a gate electrode of the first transistor, and a second transistor configured to control the connection between the first node and the second node according to a sensing enable signal of the sensing enable signal line. The circuit board includes a first switch configured to control a connection between a first power voltage and the second node according to a first switch control signal.

The first switch control signal may be an inverted signal of the sensing enable signal.

The circuit board may further include a second switch configured to control a connection between a sensing power voltage and the second node according to a second switch control signal.

The second switch control signal may be the same as the sensing enable signal.

The sub-pixel may further include a third transistor configured to supply a data voltage of a data line to the gate electrode of the first transistor according to a scan signal of a scan line, a fourth transistor configured to supply an initialization voltage of a sensing line to the first node according to a sensing scan signal of a sensing scan line, and a capacitor between the gate electrode of the first transistor and the first node.

One frame period in the display mode may include a first period and a second period. The scan signal and the sensing scan signal may be generated as a first level voltage during the first period and are generated as a second level voltage during the second period. The sensing enable signal and the second switch control signal may be generated as the second level voltage during the first period and the second period. The first switch control signal may be generated as the first level voltage during the first period and the second period.

A sensing mode may include a first period, a second period, and a third period. The scan signal and the sensing scan signal may be generated as a first level voltage during the second period, and may be generated as a second level voltage during the first period and the third period. The sensing enable signal and the second switch control signal may be generated as the first level voltage during the first period and the second period. The first switch control signal may be generated as the second level voltage during the first period and the second period.

According to one or more embodiments of the present disclosure, there is provided a driving method of a display device including a plurality of light emitting elements connected to a scan line, a sensing scan line, a data line, a sensing line, and a sensing enable signal line and located between a first node and a second node, and a sub-pixel including a first transistor for supplying a driving current to the first node according to a voltage of a gate electrode of the first transistor, the method including connecting the first node and the second node in a sensing mode, and applying a reference voltage of the data line to the gate electrode of the first transistor in the sensing mode to supply a driving current of the first transistor to the sensing line according to the reference voltage.

The driving method of the display device may further include applying a sensing power voltage to the first node in the sensing mode.

The plurality of light emitting elements may include a first light emitting element including a first electrode connected to the first node and a second electrode connected to the second node, and a second light emitting element including a first electrode connected to the second node and a second electrode connected to the first node.

According to the aforementioned and other embodiments of the present disclosure, since a first node and a second node have substantially the same potential in the sensing mode using the second transistor connecting the first node and the second node, the driving current of the first transistor, which is the driving transistor, may not leak to the second node through the light emitting elements. Also, the driving current of the first transistor may flow to the second node through the second transistor, but the driving current of the first transistor flowing to the second node through the second transistor may be predicted. Accordingly, it is possible to prevent an error from occurring in the sensing voltage of the sensing line due to leakage current caused by the light emitting elements arranged in the reverse direction.

DETAILED DESCRIPTION

Figure 1:
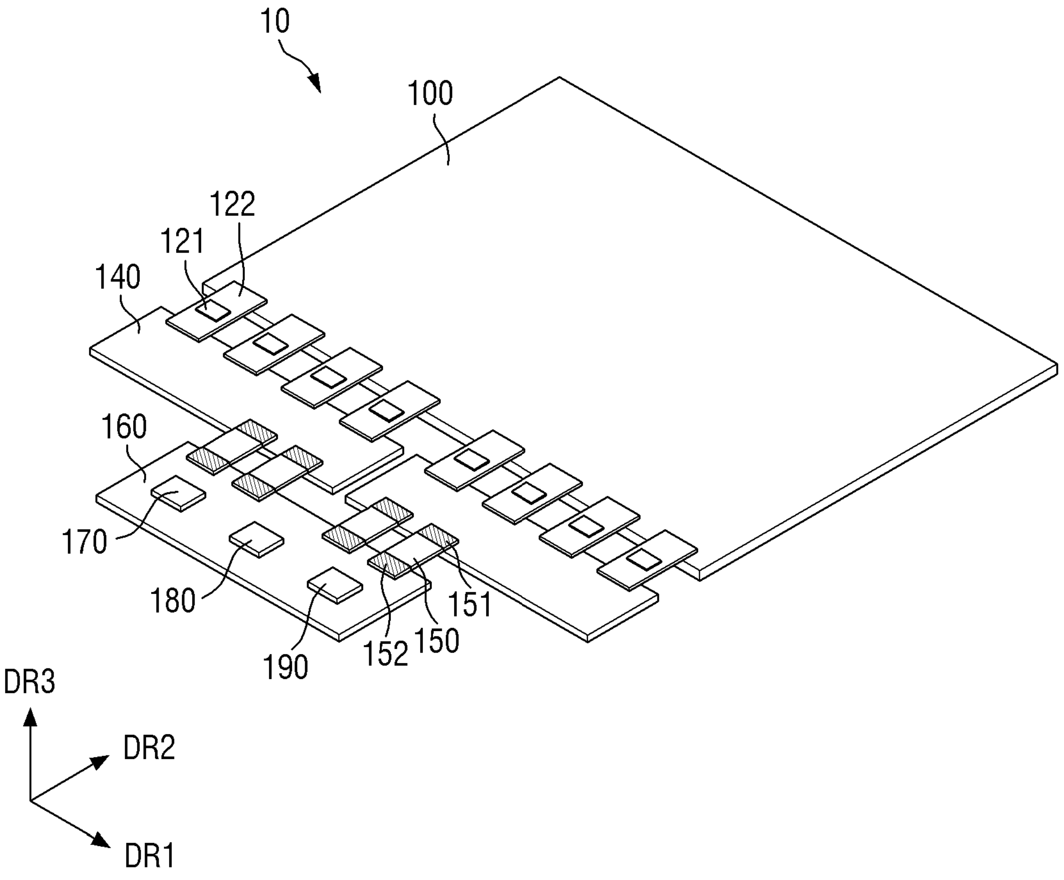
FIG. 1 is a perspective view illustrating a display device according to one or more embodiments.

Aspects and features of embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure might not be described.

Unless otherwise noted, like reference numerals, characters, or combinations thereof denote like elements throughout the attached drawings and the written description, and thus, descriptions thereof will not be repeated. Further, parts not related to the description of one or more embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "in plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. Other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," "one of," and "selected from," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, the term "and/or" includes any and all combinations of one or more of the associated listed items. For example, the expression such as "A and/or B" may include A, B, or A and B. Further, the use of "may" when describing embodiments of the present disclosure refers to "one or more embodiments of the present disclosure".

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, for example, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning for example consistent with their meaning in the context of the relevant art and/or the present specification, and should not be interpreted in an idealized or overly formal sense, unless expressly so defined herein.

Figure 2:
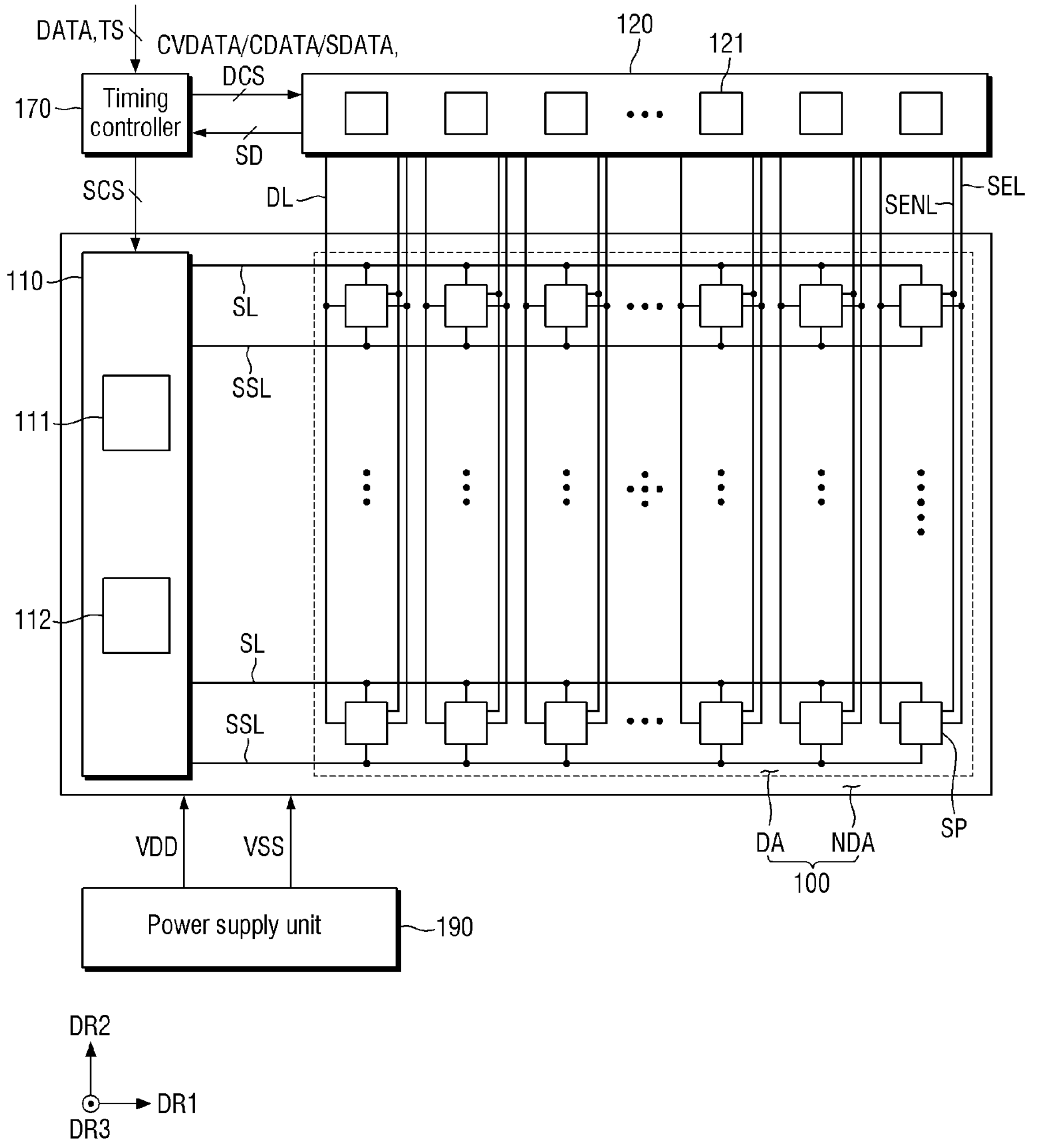
FIG. 2 is a block diagram illustrating a display device according to one or more embodiments.

FIG. 1 is a perspective view illustrating a display device according to one or more embodiments. FIG. 2 is a block diagram illustrating a display device according to one or more embodiments.

Referring to FIGS. 1 and 2, a display device 10 according to one or more embodiments includes a display panel 100, a scan driver 110, a data driver 120, flexible films 122, and a source circuit board 140, a first flexible cable 150, a control circuit board 160, a timing control unit 170, a memory 180, and a power supply unit 190.

The display panel 100 includes a display area DA and a non-display area NDA provided around the display area DA along an edge or periphery of the display area DA. The display area DA is an area in which sub-pixels SP are formed to display an image.

The display panel 100 includes data lines DL, sensing lines SEL, sensing enable lines SENL, scan lines SL, sensing scan lines SSL, and sub-pixels SP. The scan lines SL and the sensing scan lines SSL may be extended in the first direction DR1. The scan lines SL and the sensing scan lines SSL may be arranged along the second direction DR2. The data lines DL, the sensing lines SEL, and the sensing enable lines SENL may be extended in the second direction DR2. The data lines DL, the sensing lines SEL, and the sensing enable lines SENL may be arranged along the first direction DR1.

Figure 6:
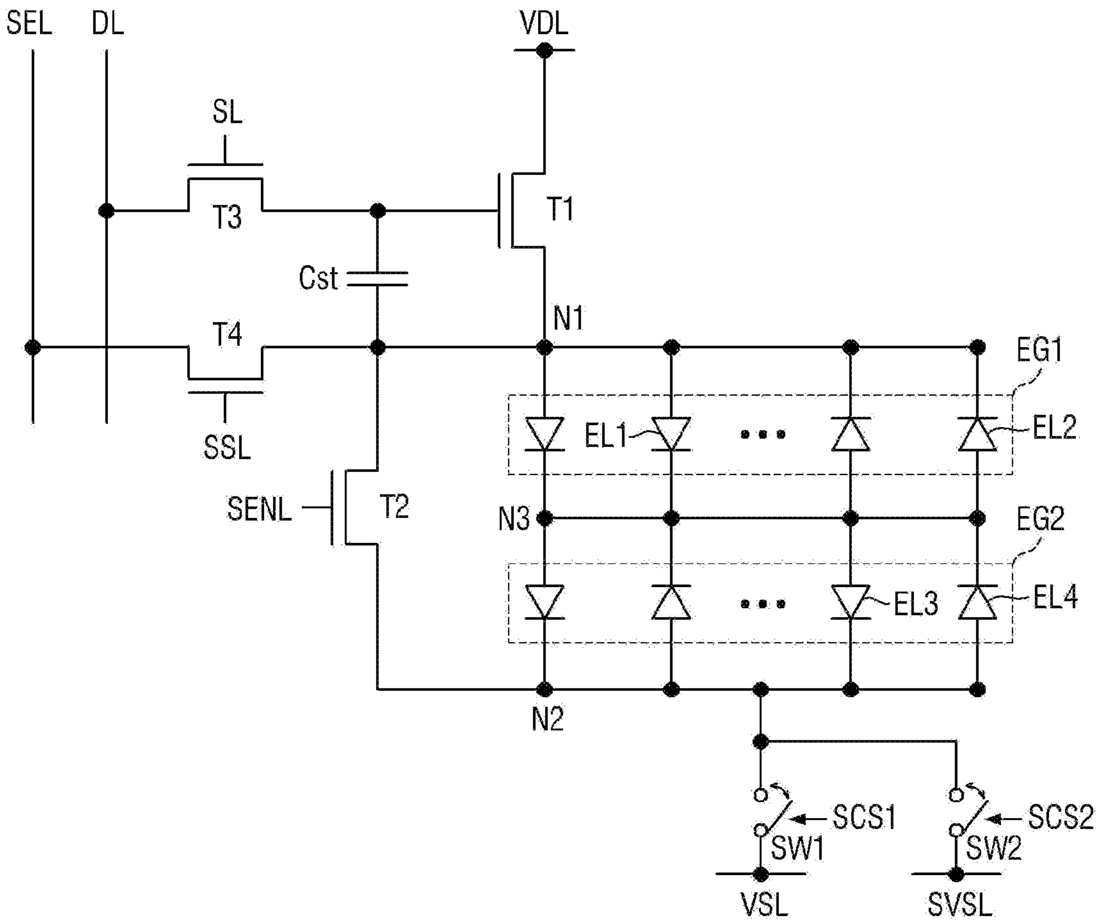
FIG. 6 is a circuit diagram illustrating a sub-pixel according to one or more embodiments.

Each of the sub-pixels SP may be connected to any one of the data lines DL, any one of the sensing lines SEL, any one of the scan lines SL, any one of the sensing scan lines SSL, and any one of the sensing enable lines SENL. Each of the sub-pixels SP may include a plurality of light emitting elements and a plurality of transistors T1, T2, T3, and T4 for supplying driving current to the plurality of light emitting elements as shown in FIG. 6. A detailed description of the sub-pixels SP will be described later with reference to FIG. 6.

The scan driver 110 and the data driver 120 may be referred to as a display panel driver.

The scan driver 110 includes a scan signal output unit 111 and a sensing scan signal output unit 112. The scan signal output unit 111 is connected to the scan lines SL to apply scan signals. The scan signal output unit 111 generates scan signals according to the scan timing control signal SCS input from a timing controller 170 and applies them to the scan lines SL.

The sensing scan signal output unit 112 is connected to the sensing scan lines SSL to apply sensing signals. The sensing scan signal output unit 112 generates sensing scan signals according to the scan timing control signal SCS input from the timing controller 170 and applies them to the sensing scan lines SSL.

The scan signal output unit 111 and the sensing scan signal output unit 112 may include a plurality of transistors. In this case, the scan signal output unit 111 and the sensing scan signal output unit 112 may be disposed in the non-display area NDA of the display panel 100.

The data driver 120 may include at least one source driving circuit 121 as shown in FIG. 2. Each of the source driving circuits 121 may be an integrated circuit. FIG. 2 illustrates that the data driver 120 includes eight source driving circuits 121, but the number of the source driving circuits 121 is not limited thereto.

Each source driving circuit 121 may be mounted on each flexible film 122. Each flexible film 122 may be a tape carrier package or a chip on film. Each flexible film 122 may be bent. Each flexible film 122 may be attached to the display panel 100 and the source circuit board 140. Each flexible film 122 may be attached on one surface of the display panel 100 using an anisotropic conductive film, whereby each source driving circuit 121 may be connected to the data lines DL.

The data driver 120 is connected to data lines to supply data voltages. The data driver 120 receives digital data and a data timing control signal DCS from the timing controller 170. The digital data may be compensation video data CDATA or sensing digital data SDATA.

The data driver 120 receives the compensation video data CDATA in the display mode, converts the compensation video data CDATA into data voltages according to the data timing control signal DCS, and supplies the converted video data CDATA to the data lines DL. The display mode is a mode in which the sub-pixels SP emit light to display an image.

The data driver 120 receives the sensing digital data SDATA in the sensing mode, converts the sensing digital data SDATA into a data voltage according to the data timing control signal DCS, and supplies the converted sensing digital data SDATA to the data lines. The sensing mode is a mode of sensing the voltage of the first electrode of the first transistor to compensate for the threshold voltage of the first transistor corresponding to the driving transistor of each of the sub-pixels SP.

Also, the data driver 120 may be connected to the sensing lines SEL and the sensing enable lines SENL. The data driver 120 may supply an initialization voltage to the sensing lines SEL in the display mode. The data driver 120 may sense sensing voltages from the sensing lines SEL in the sensing mode. The data driver 120 may convert the sensing voltages of the sensing lines SEL into sensing data SD in the sensing mode and supply the converted sensing voltages to the timing control unit 170.

The data driver 120 may apply a sensing enable signal to each of the sensing enable lines SENL in the display mode and the sensing mode. The sensing enable signal may be a signal commonly applied to the sensing enable lines SENL, but the present specification is not limited thereto.

The source circuit board 140 may include first connectors 151 to be connected to the first flexible cables 150. The source circuit board 140 may be connected to the first flexible cables 150 through the first connectors 151. The source circuit board 140 may be a flexible printed circuit board or a printed circuit board.

The control circuit board 160 may include second connectors 152 to be connected to the first flexible cables 150. The control circuit board 160 may be connected to the first flexible cables 150 through the second connectors 152.

Although FIG. 1 illustrated the source circuit board 140 and the control circuit board 160 are connected to a plurality of first flexible cables 150 through a plurality of first connectors 151 and a plurality of second connectors 152, the present disclosure is not limited thereto. That is, each of the source circuit board 140 and the control circuit board 160 may be connected to one first flexible cable 150 through one first connector 151 and one second connector 152.

The timing controller 170 receives digital video data DATA and timing signals TS from the system-on-chip. The timing signals may include a vertical sync signal, a horizontal sync signal, a data enable signal, a clock signal such as a dot clock, and the like.

The timing controller 170 generates control signals for controlling operation timings of the source driving circuits 121 of the data driver 120, the scan signal output unit 111 of the scan driver 110, and the sensing scan signal output unit 112. That is, the control signals may include the data timing control signal DCS for controlling operation timings of the source driving circuits 121, and a scan timing control signal SCS for controlling operation timings of the scan signal output unit 111 and the sensing scan signal output unit 112.

The timing controller 170 may control the display device 10 in one of a display mode and a sensing mode. The display mode is a mode in which the sub-pixels SP emit light by supplying data voltages according to the compensation video data CDATA to the sub-pixels SP to display an image. The sensing mode is a mode in which a data voltage according to the sensing digital data SDATA is supplied to the sub-pixels SP, and suitable voltages (e.g., predetermined voltages) of the sub-pixels SP are sensed through the sensing lines SEL. Specifically, the sensing mode is a mode in which the voltage of the first electrode of the first transistor T1 is sensed according to the sensing digital data SDATA to compensate for the threshold voltage of the first transistor T1 of each of the sub-pixels SP.

The timing controller 170 converts the digital video data DATA into the compensation video data CVDATA using the compensation data CDATA stored in the memory 180 in the display mode. The timing controller 170 outputs the compensation video data CVDATA or compensation data CDATA and the data timing control signal DCS to the data driver 120 and outputs the scan timing control signal SCS to the scan driver 110 in the display mode.

The timing controller 170 outputs the sensing digital data SDATA and the data timing control signal DCS stored in the memory 180 to the data driver 120 in the sensing mode, and outputs the scan timing control signal SCS to the scan driver 110. The timing controller 170 receives the sensing data SD from the data driver 120 in the sensing mode, generates new compensation data according to the sensing data SD, and stores new compensation data in the memory 180. That is, the timing controller 170 updates the compensation data CDATA stored in the memory 180 by reflecting the sensing data SD sensed in the sensing mode. The sensing data SD is data obtained by converting the first electrode voltage of the first transistor of each of the sub-pixels SP sensed through the sensing lines SEL in the sensing mode into digital data.

The memory 180 stores the sensing digital data SDATA and the compensation data CDATA. The timing controller 170 may read the sensing digital data SDATA and the compensation data CDATA from the memory 180 and may write the new compensation data calculated by calculating the sensing data SD to the memory 180. The memory 180 may include a volatile memory and a non-volatile memory. The volatile memory may be a DDR memory, and the non-volatile memory may be a NAND flash memory.

The power supply unit 190 may generate an initialization voltage, a first power voltage VSS corresponding to a low potential voltage, and a second power voltage VDD corresponding to a high potential voltage from the main power source recognized from the outside. The power supply unit 190 may supply driving voltages to the source drive circuits 121, the scan signal output unit 111, the sensing scan signal output unit 112, the timing control unit 170, and the memory 180. The source drive circuits 121 may be implemented on one or more integrated circuit (IC) chips as those skilled in the art would appreciate.

The timing control unit 170, the memory 180, and the power supply unit 190 may be mounted on the control circuit board 160. In this case, the timing control unit 170 and the power supply unit 190 may be formed in the form of a chip like an integrated circuit. The control circuit board 160 may be a flexible printed circuit board or a printed circuit board.

Figure 3:
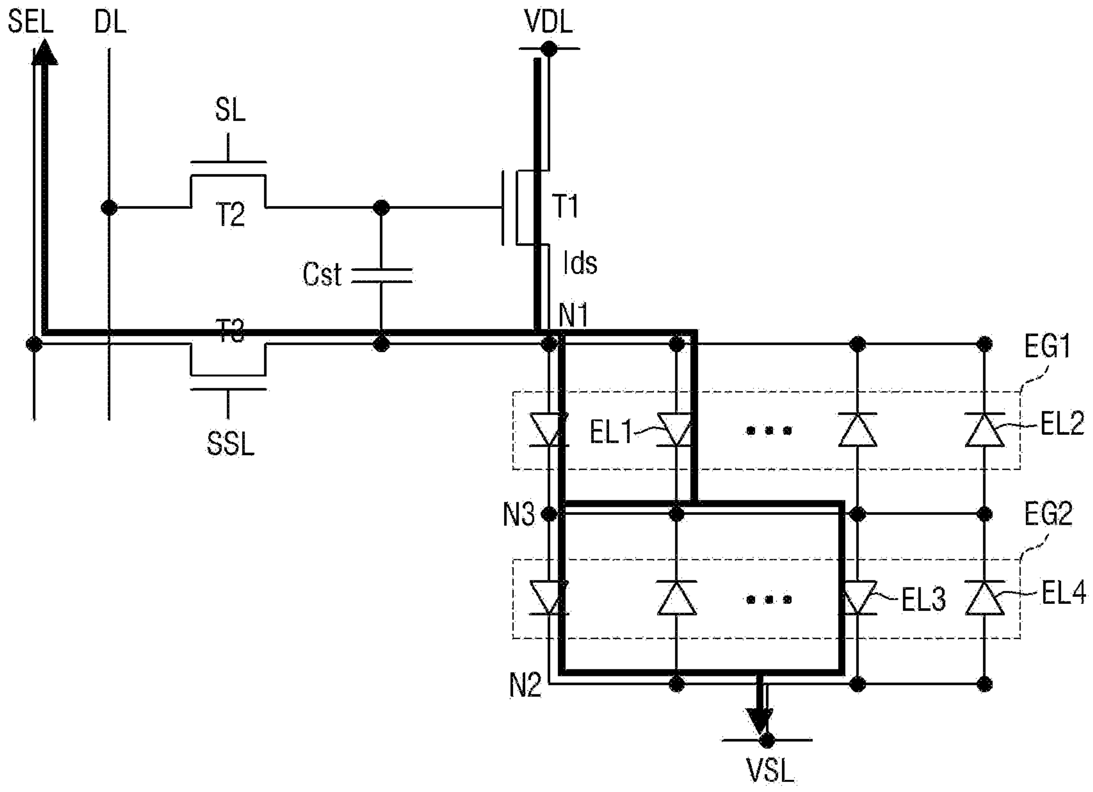
FIGS. 3 and 4 are circuit diagrams illustrating sub-pixels according to one or more embodiments.
Figure 4:
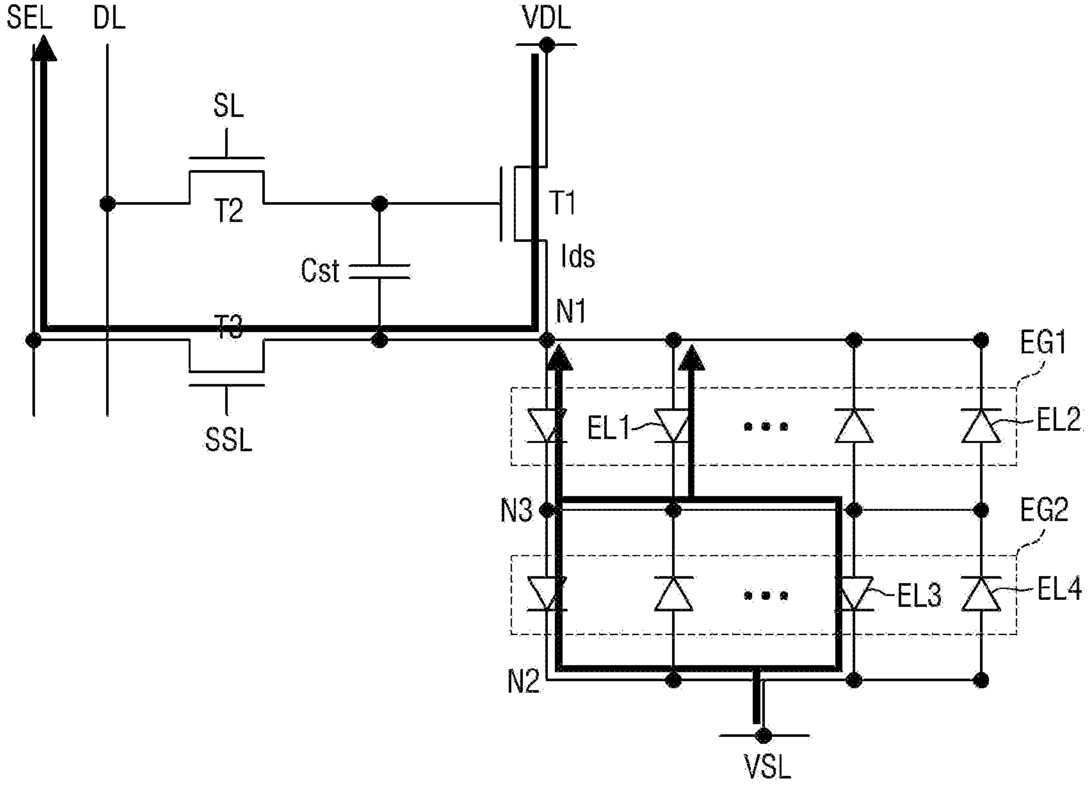
Figure 5:
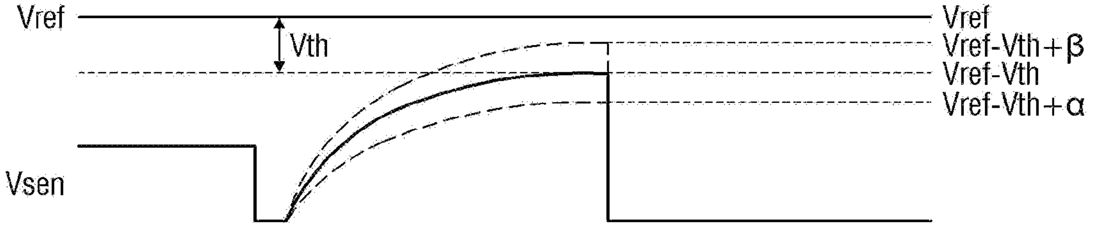
FIG. 5 is a waveform diagram illustrating a sensing voltage of a sensing line connected to a sub-pixel in a sensing mode.

FIGS. 3 and 4 are circuit diagrams illustrating sub-pixels according to one or more embodiments. FIG. 5 is a waveform diagram illustrating a sensing voltage of a sensing line connected to a sub-pixel in a sensing mode.

Referring to FIGS. 3 and 4, the sub-pixel SP according to one or more embodiments may include a first transistor T1, a second transistor T2, a third transistor T3, a capacitor Cst, and a plurality of light emitting elements EL1, EL2, EL3, and EL4.

The first transistor T1 may be a driving transistor that controls a driving current flowing from a second power supply line VDL to the first node N1 according to the voltage of the gate electrode. The second transistor T2 supplies the data voltage of the data line DL to the gate electrode according to the scan signal of the scan line SL. The third transistor T3 controls the connection between the sensing line SEL and the first node N1 according to the sensing scan signal of the sensing scan line SSL. The capacitor Cst is disposed between the gate electrode of the first transistor T1 and the first node N1.

The plurality of light emitting elements EL1, EL2, EL3, and EL4 may be disposed between the first node N1 and a second node N2. The plurality of light emitting elements EL1, EL2, EL3, and EL4 includes a first light emitting element group EG1 including first light emitting elements EL1 and second light emitting elements EL2 and a second light emitting element group EG2 including third light emitting elements EL3 and fourth light emitting elements EL4. Each of the first light emitting elements EL1 includes a first electrode connected to the first node N1 and a second electrode connected to a third node N3. Each of the second light emitting elements EL2 includes a first electrode connected to the third node N3 and a second electrode connected to the first node N1. Each of the third light emitting elements EL3 includes a first electrode connected to the third node N3 and a second electrode connected to the second node N2. Each of the fourth light emitting elements LE4 includes a first electrode connected to the second node N2 and a second electrode connected to the third node N3. The first electrode of each of the plurality of light emitting elements EL1, EL2, EL3, and EL4 may be an anode electrode, and the second electrode of them may be a cathode electrode. The second node N2 may be connected to a first power supply line VSL for supplying the first power voltage VSS.

That is, the first light emitting elements EL1 may be connected between the first node N1 and the third node N3 in the forward direction, and the second light emitting elements EL2 may be connected between the first node N1 and the third node N3 in the reverse direction. The third light emitting elements EL3 may be connected between the third node N3 and the second node N2 in the forward direction, and the fourth light emitting elements EL4 may be connected between the third node N3 and the second node N2 in the reverse direction. The first light emitting elements EL1 and the third light emitting elements EL3 may have a two-series structure connected to each other in series, and the second light emitting elements EL2 and the fourth light emitting elements EL4 may have a serial structure connected to each other in series.

In the sensing mode, the driving current Ids of the first transistor T1 according to the sensing data voltage Vref applied to the gate electrode of the first transistor T1 flows to the sensing line SEL. In addition, when the first power voltage applied to the first power supply line VSL is lower than the second power voltage applied to the second power supply line VDL, the driving current Ids of the first transistor T1 may leak through a path formed by the node N1, the first light emitting elements EL1, the third node N3, the third light emitting elements EL3, the second node N2, and the first power supply line VSL. In this case, the sensing voltage Vsen may have a voltage $Vref-Vth+\alpha$ lower than the difference voltage Vref-Vth between the sensing data voltage Vref of the gate electrode of the first transistor T1 and the threshold voltage Vth as shown in FIG. 5. Here, $\alpha$ is a real number that is less than 0.

Alternatively, when the first power voltage applied to the first power supply line VSL is higher than the second power voltage applied to the second power supply line VDL in the sensing mode, leakage current may flow to the first node N1 through the first power supply line VSL, the second node N2, the third light emitting elements EL3, the third node N3, and the first light emitting elements EL1. Therefore, the sensing voltage Vsen may have a voltage VREF−Vth+β higher than the difference voltage Vref-Vth between the sensing data voltage Vref of the gate electrode of the first transistor T1 and the threshold voltage Vth as shown in FIG. 5. Here, β is a real number that is greater than 0.

In summary, some of the plurality of light emitting elements EL1, EL2, EL3, and EL4, that is, the first light emitting elements EL1 and the third light emitting elements EL3 are aligned in a forward direction, and the rest, that is, the second light emitting elements EL2 and the fourth light emitting elements EL4 are aligned in the reverse direction. At this time, from among the plurality of light emitting elements EL1, EL2, EL3, and EL4 the number of first light emitting elements EL1 and the number of third light emitting elements EL3 aligned in the forward direction, and the number of second light emitting elements EL2 and the number of fourth light emitting elements EL4 aligned in the reverse direction may be different for each sub-pixel. Therefore, the sensing voltage Vsen of the sensing line SEL has a voltage different from the difference voltage Vref-Vth between the sensing data voltage Vref of the gate electrode of the first transistor T1 and the threshold voltage Vth due to the leakage current caused by the plurality of light emitting elements EL1, EL2, EL3, and EL4. Accordingly, an error may occur in the threshold voltage Vth of the first transistor T1 calculated by the sensing voltage Vsen. Furthermore, because the magnitude of the leakage current is different for each sub-pixel, it is difficult to predict the error. Accordingly, it may be difficult to accurately compensate the threshold voltage Vth of the first transistor T1.

FIG. 6 is a circuit diagram illustrating a sub-pixel according to one or more embodiments.

Referring to FIG. 6, the sub-pixel SP according to one or more embodiments may include a plurality of light emitting elements EL1, EL2, EL3, and EL4, the first transistor T1, the second transistor T2, the third transistor T3, the fourth transistor T4, and the capacitor Cst.

Each of the plurality of light emitting elements EL1, EL2, EL3, and EL4 may be the inorganic light emitting diode made of an inorganic material. The plurality of light emitting elements EL1, EL2, EL3, and EL4 includes the first light emitting element group EG1 including first light emitting elements EL1 and second light emitting elements EL2 and the second light emitting element group EG2 including the third light emitting elements EL3 and the fourth light emitting elements EL4. Each of the first light emitting elements EL1 includes a first electrode connected to the first node N1 and a second electrode connected to the third node N3. Each of the second light emitting elements EL2 includes a first electrode connected to a third node N3 and a second electrode connected to the first node N1. Each of the third light emitting elements EL3 includes a first electrode connected to the third node N3 and a second electrode connected to the second node N2. Each of the fourth light emitting elements EL4 includes a first electrode connected to the second node N2 and a second electrode connected to the third node N3. The first electrode of each of the plurality of light emitting elements EL1, EL2, EL3, and EL4 may be an anode electrode, and the second electrode may be a cathode electrode.

The first transistor T1 adjusts the driving current flowing from the second power supply line VDL to which the second power voltage VDD is applied to the first node N1 according to the voltage difference between the gate electrode and the source electrode of the first transistor T1. The gate electrode of the first transistor T1 may be connected to the first electrode of the third transistor T3, the first electrode may be connected to the first node N1, and the second electrode may be connected to the second power supply line VDL.

The second transistor T2 controls the connection between the first node N1 and the second node N2 according to the sensing enable signal SEN of the sensing enable line SENL. The gate electrode of the second transistor T2 may be connected to the sensing enable line SENL, the first electrode may be connected to the first node N1, and the second electrode may be connected to the second node N2.

The third transistor T3 supplies the data voltage of the data line DL to the gate electrode of the first transistor T1 according to the scan signal of the scan line SL. The gate electrode of the third transistor T3 may be connected to the scan line SL, the first electrode may be connected to the gate electrode of the first transistor T1, and the second electrode may be connected to the data line DL.

The fourth transistor T4 controls the connection between the sensing line SEL and the first node N1 according to the sensing scan signal of the sensing scan line SSL. The gate electrode of the fourth transistor T4 may be connected to the sensing scan line SSL, the first electrode may be connected to the first node N1, and the second electrode may be connected to the sensing line SEL.

The first electrode of each of the first to fourth transistors T1, T2, T3, and T4 may be the source electrode and the second electrode may be the drain electrode, but the present specification are not limited thereto. That is, the first electrode of each of the first to fourth transistors T1, T2, T3, and T4 may be the drain electrode, and the second electrode may be the source electrode.

The capacitor Cst is disposed between the gate electrode of the first transistor T1 and the first node N1. The capacitor Cst stores the difference voltage between the gate voltage of the first transistor T1 and the first node N1.

The first to fourth transistors T1, T2, T3, and T4 may be formed of thin film transistors. Also, in FIG. 6, the first to fourth transistors T1, T2, T3, and T4 are mainly described as being formed of an N-type Metal Oxide Semiconductor Field Effect Transistor (MOSFET), but it should be noted that the present disclosure is not limited thereto. The first to fourth transistors T1, T2, T3, and T4 may be formed of a P-type MOSFET. In this case, the timing diagrams of FIGS. 7 and 8 may be appropriately modified according to the characteristics of the P-type MOSFET.

A first switch SW1 may be controlled according to the first switch control signal SCS1. When the first switch SW1 is turned-on, the second node N2 may be connected to the first power supply line VSL. In this case, the first power voltage VSS may be applied to the second node N2.

A second switch SW2 may be controlled according to the second switch control signal SCS2. When the second switch SW2 is turned-on, the second node N2 may be connected to the third power supply line SVSL. In this case, the third power voltage may be applied to the second node N2. The third power voltage may be different from the first power voltage VSS. Alternatively, the third power voltage may be substantially the same as the first power voltage VSS. In this case, the same voltage is applied to the first power supply line VSL and the third power supply line SVSL, but may be electrically separated.

The first switch SW1 and the second switch SW2 may be disposed on the flexible film 122 or the source circuit board 140. The timing controller 170 may be generated and output the second transistor T2 sensing enable signal SEN of each of the sub-pixels SP, the first switch control signal SCS1 for controlling the first switch SW1, and the second switch SW2 for the second switch control signal SCS2.

Figure 7:
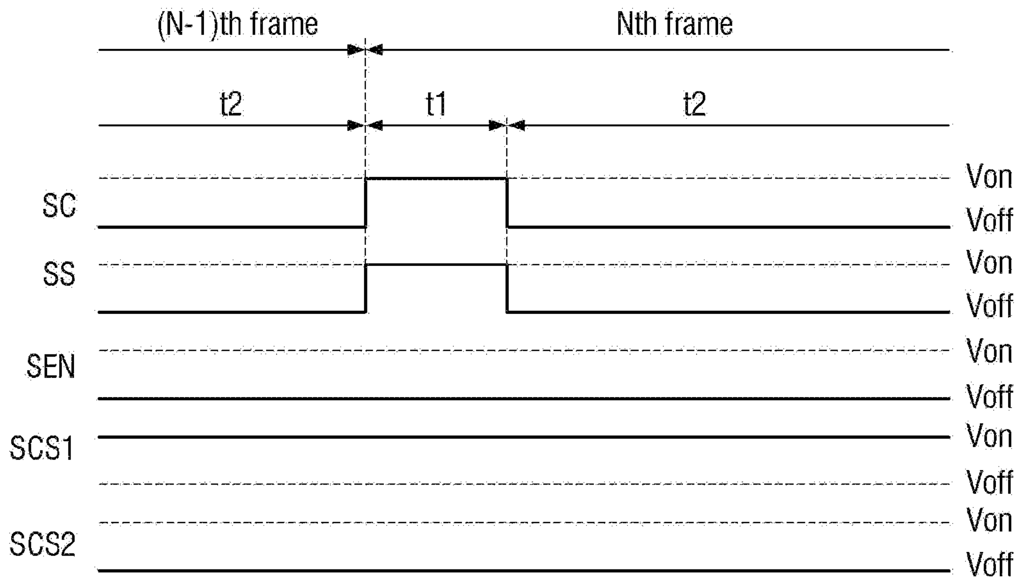
FIG. 7 is a waveform diagram illustrating a scan signal, a sensing signal, a sensing enable signal, a first switch control signal, and a second switch control signal applied to a sub-pixel in a display mode.

FIG. 7 is a waveform diagram illustrating a scan signal, a sensing signal, a sensing enable signal, a first switch control signal, and a second switch control signal applied to a sub-pixel in a display mode.

Referring to FIG. 7, an $N^{th}$ (N is an integer greater than or equal to 2) frame period may include a first period t1 and a second period t2 in the display mode. The first period t1 is a period in which a data voltage is supplied to the gate electrode of the first transistor T1 and the first electrode of the first transistor T1 is initialized to an initialization voltage. The second period t2 is a period in which the first light emitting elements EL1 and the third light emitting elements EL3 arranged in the forward direction from among the plurality of light emitting elements EL1, EL2, EL3, and EL4 emits light according to the driving current Ids of the first transistor T1.

The scan signal SC of the scan line SL and the sensing scan signal SS of the sensing scan line SSL may have a gate-on voltage Von during the first period t1 and may have a gate-off voltage Voff during the second period t2 in the display mode. The sensing enable signal SEN of the sensing enable line SENL may have a gate-off voltage Voff during the first period t1 and the second period t2 in the display mode.

The second transistor T2, the third transistor T3, and the fourth transistor T4 of the sub-pixel SP may be turned-on by the gate-on voltage Von and may be turned-off by the gate-off voltage Voff. Therefore, the second transistor T2 may be turned-off during the first period t1 and the second period t2 of the $N^{th}$ frame period in the display mode. Also, in the display mode, the third transistor T3 and the fourth transistor T4 may be turned-on during the first period t1 of the $N^{th}$ frame period and may be turned-off during the second period t2 of the $N^{th}$ frame period.

The first switch control signal SCS1 may have the gate-on voltage Von during the first period t1 and the second period t2 in the display mode. The second switch control signal SCS2 may have the gate-off voltage Voff during the first period t1 and the second period t2 in the display mode. In the display mode, the first switch control signal SCS1 may be an inverted signal of the sensing enable signal SEN, and the second switch control signal SCS2 may be substantially the same as the sensing enable signal SEN.

Each of the first switch SW1 and the second switch SW2 may be turned-on by the gate-on voltage Von and may be turned-off by the gate-off voltage Voff. Therefore, in the display mode, the first switch SW1 may be turned-on during the first and second periods t1 and t2 of the $N^{th}$ frame period, and the second switch SW2 may be turned-off. In the display mode, the first power voltage VSS of the first power supply line VSL may be supplied to the second node N2.

Hereinafter, the operation of the sub-pixel SP during the first period t1 and the second period t2 of the $N^{th}$ frame period in the display mode will be described in detail with reference to FIGS. 6 and 7.

First, during the first period t1, the third transistor T3 is turned-on by the scan signal SC of the gate-on voltage Von supplied to the scan line SL. During the first period t1, the fourth transistor T4 is turned-on by the sensing scan signal SS of the gate-on voltage Von supplied to the sensing scan line SSL. The data voltage of the data line DL is supplied to the gate electrode of the first transistor T1 due to the turn-on of the third transistor T3 during the first period t1. The initialization voltage of the sensing line SEL is supplied to the first node N1 due to the turn-on of the fourth transistor T4 during the first period t1.

Second, during the second period t2, the third transistor T3 is turned-off by the scan signal SC of the gate-off voltage Voff supplied to the scan line SL. During the second period t2, the fourth transistor T4 is turned-off by the sensing scan signal SS of the gate-off voltage Voff supplied to the sensing scan line SSL.

During the second period t2, the driving current Ids according to the voltage difference between the gate voltage and the source voltage of the first transistor T1 flows to the first light emitting elements EL1 and the third light emitting elements EL3 arranged in the forward direction from the second power supply line VDL through the first node N1. Accordingly, the first light emitting elements EL1 and the third light emitting elements EL3 may emit light with a desired luminance (e.g., a predetermined luminance).

As described above, the driving current Ids generated according to the data voltage generated according to the compensation video data CVDATA obtained by compensating the digital video data by using the compensation data CDATA in the display mode is applied to the first light emitting elements EL1 and the third light emitting elements EL3. Therefore, the first light emitting elements EL1 and the third light emitting elements EL3 may emit light according to the driving current Ids of the first transistor T1 that does not depend on the threshold voltage of the first transistor T1.

Figure 8:
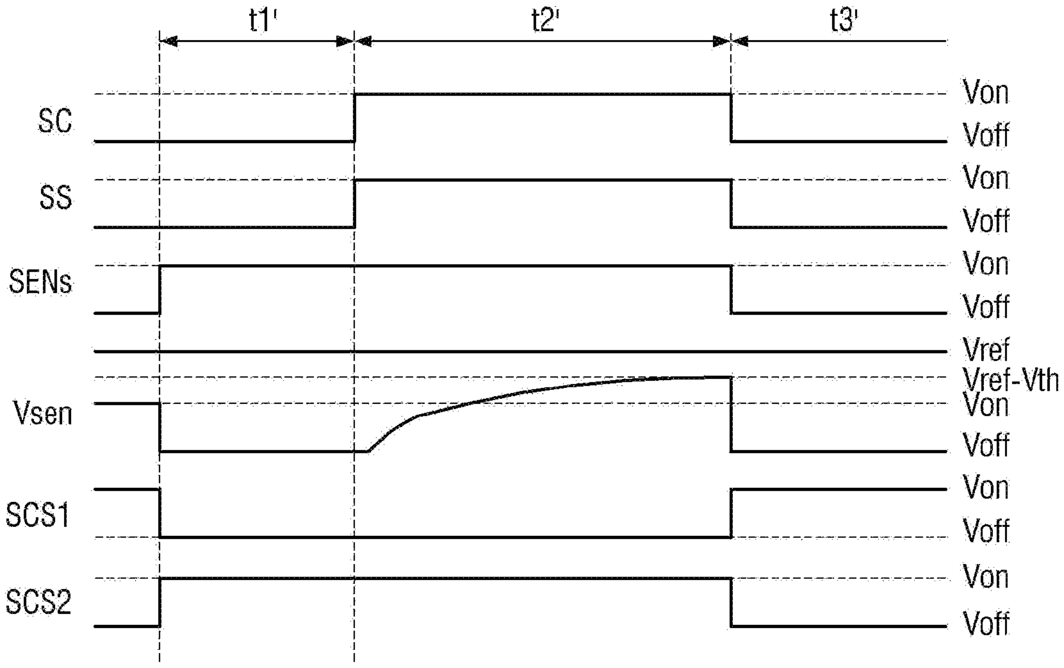
FIG. 8 is a waveform diagram illustrating a scan signal, a sensing signal, a sensing enable signal, a first switch control signal, a second switch control signal, and a sensing voltage applied to a sub-pixel in a sensing mode.

FIG. 8 is a waveform diagram illustrating a scan signal, a sensing signal, a sensing enable signal, a first switch control signal, a second switch control signal, and a sensing voltage applied to a sub-pixel in a sensing mode.

Referring to FIG. 8, the sensing mode may include first to third periods t1' to t3'. The first period t1' is a period in which the first node N1 and the second node N2 are connected. The second period t2' is a period in which the sensing data voltage Vref is supplied to the gate electrode of the first transistor T1 and the source voltage of the first transistor T1, that is, the voltage of the first node N1 is sensed. The third period t3' is a break period.

The scan signal SC of the scan line SL and the sensing scan signal SS of the sensing scan line SSL may have the gate-on voltage Von during the second period t2' in the sensing mode, and may have the gate-off voltage Voff during the first period t1' and the third period t3'. The sensing enable signal SEN of the sensing enable line SENL may have the gate-on voltage Von during the first period t1' and the second period t2', and may have the gate-off voltage Voff during the third period t3' in the sensing mode.

The second transistor T2 may be turned-on during the first period t1' and the second period t2' in the sensing mode, and may be turned-off during the third period t3'. Also, the third transistor T3 and the fourth transistor T4 are turned-on during the second period t2' and may be turned-off during the first period t1' and the third period t3' in the sensing mode.

The first switch control signal SCS1 may have the gate-off voltage Voff during the first period t1' and the second period t2', and may have the gate-on voltage Von during the third period t3' in the sensing mode. The second switch control signal SCS2 may have the gate-on voltage Von during the first period t1' and may have the gate-off voltage Voff during the third period t3' in the sensing mode. In the sensing mode, the first switch control signal SCS1 may be an inverted signal of the sensing enable signal SEN, and the second switch control signal SCS2 may be substantially the same as the sensing enable signal SEN.

The first switch SW1 may be turned-on during the third period t3' and may be turned-off during the first period t1' and the second period t2' in the sensing mode. The second switch SW2 may be turned-on during the first period t1' and the second period t2' and may be turned-off during the third period t3' in the sensing mode. In the sensing mode, the third power voltage of the third power supply line SVSL may be supplied to the second node N2.

Figure 9:
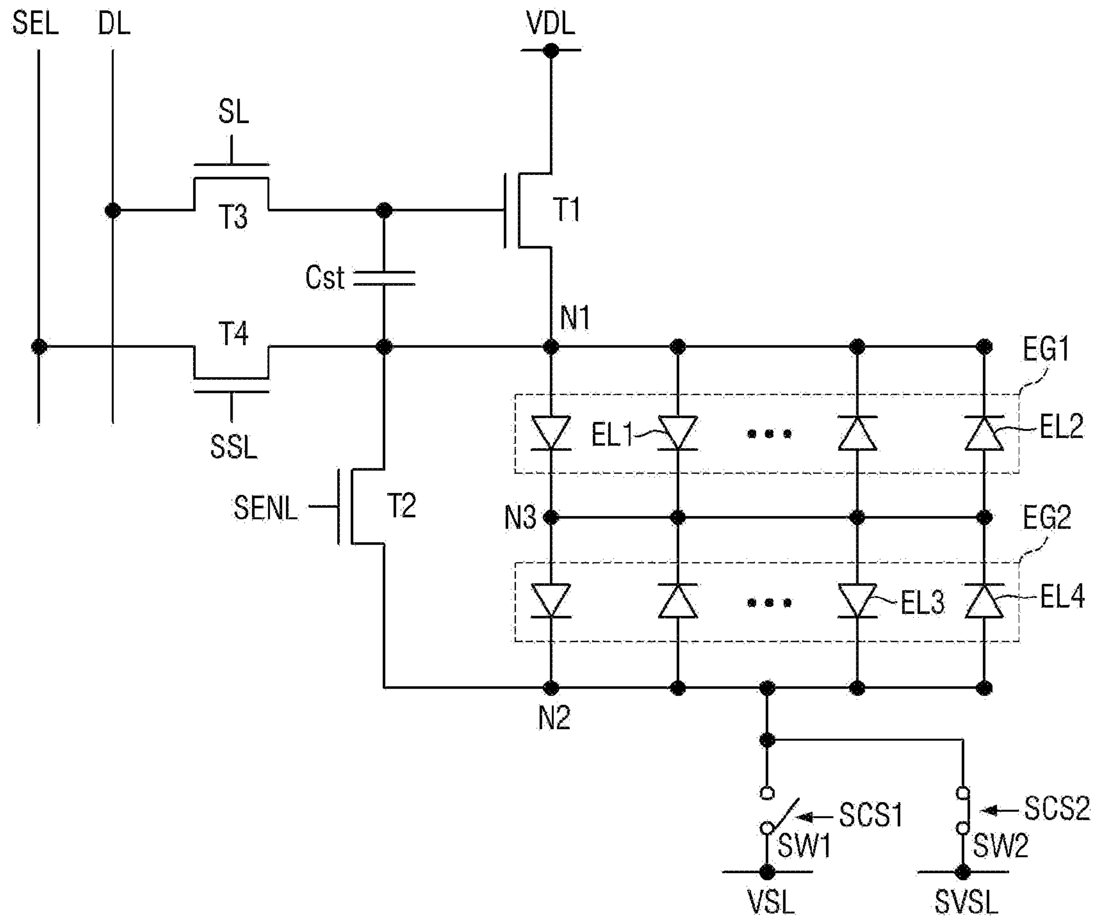
FIGS. 9 and 10 are circuit diagrams illustrating operations of sub-pixels during a first period and a second period in a sensing mode.
Figure 10:
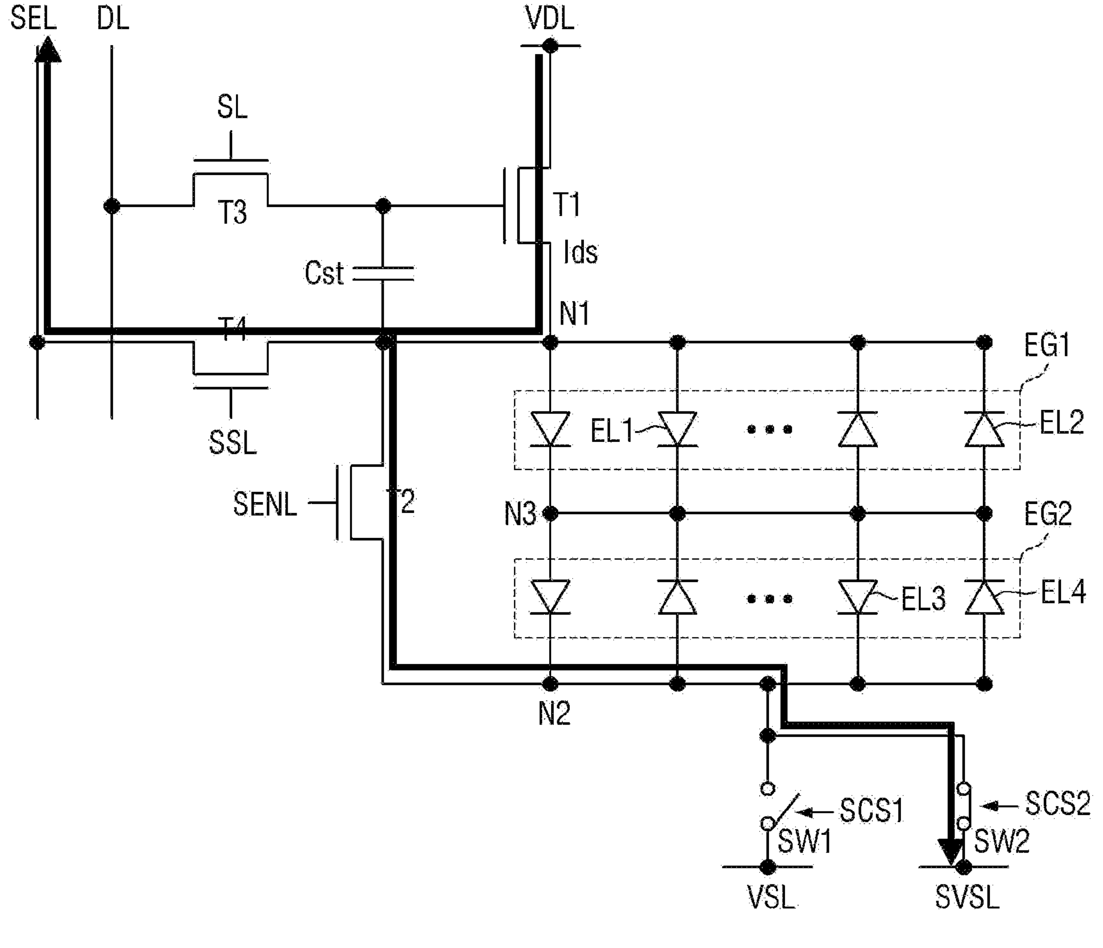

FIGS. 9 and 10 are circuit diagrams illustrating operations of sub-pixels during a first period and a second period in a sensing mode.

Hereinafter, the operation of the sub-pixel SP in the sensing mode will be described in detail with reference to FIGS. 8 and 10.

First, referring to FIG. 9, the second transistor T2 is turned-on by the sensing enable signal SEN of the gate-on voltage Von supplied to the sensing enable line SENL during a first period t1'. The third transistor T3 is turned-off by the scan signal SC of the gate-off voltage Voff supplied to the scan line SL, and the fourth transistor T4 is turned-off by the sensing scan signal SS of the gate-off voltage Voff supplied to the sensing scan line SSL. During the first period t1', the first switch SW1 is turned-off by the first switch control signal SCS1 of the gate-off voltage Voff, and the second switch SW2 is turned-on by the second switch control signal SCS2 of the gate-on voltage Von.

The third power voltage SVS of the third power supply line SVSL is supplied to the second node N2 due to the turn-on of the second switch SW2 during the first period t1'. Also, the first node N1 and the second node N2 are connected to each other due to the turn-on of the second transistor T2 during the first period t1'. Therefore, the first node N1 and the second node N2 may have substantially the same electric potential.

Second, referring to FIG. 10, the second transistor T2 is turned-on by the sensing enable signal SEN of the gate-on voltage Von supplied to the sensing enable line SENL during the second period t2'. The third transistor T3 is turned-on by the scan signal SC of the gate-on voltage Von supplied to the scan line SL, and the fourth transistor T4 is turned-on by the sensing scan signal SS of the gate-on voltage Von supplied to the sensing scan line SSL. During the second period t2', the first switch SW1 is turned-off by the first switch control signal SCS1 of the gate-off voltage Voff, and the second switch SW2 is turned-on by the second switch control signal SCS2 of the gate-on voltage Von.

Because the third transistor T3 is turned-on during the second period t2', the sensing data voltage Vref is supplied to the gate electrode of the first transistor T1. Because the voltage difference Vgs between the gate electrode and the source electrode of the first transistor T1 is greater than the threshold voltage of the first transistor T1 during the second period t2', the first transistor T1 flows current until the voltage difference Vgs between the gate electrode and the source electrode reaches the threshold voltage Vth. The driving current Ids of the first transistor T1 may flow to the sensing line SEL through the fourth transistor T4.

In this case, the third power voltage SVS of the third power supply line SVSL is supplied to the second node N2 due to the turn-on of the second switch SW2 during the second period t2'. Also, the first node N1 and the second node N2 are connected to each other due to the turn-on of the second transistor T2 during the second period t2'. Therefore, the first node N1 and the second node N2 may have substantially the same electric potential during the second period t2'.

Because the first node N1 and the second node N2 have substantially the same electric potential, the driving current Ids of the first transistor T1 may not leak to the second node N2 through the first light emitting elements EL1 and the third light emitting elements EL3. The driving current Ids of the first transistor T1 may flow to the second node N2 through the second transistor T2, but the driving current Ids of the first transistor T1 flowing to the second node N2 may be predicted. That is, from among the plurality of light emitting elements EL1, EL2, EL3, and EL4, the number of first light emitting elements EL1 and the number of third light emitting elements EL3 aligned in the forward direction, and the number of second light emitting elements EL2 and the number of fourth light emitting elements EL4 arranged in the reverse direction are different for each sub-pixel but the driving current Ids of the first transistor T1 flowing to the second node N2 through the second transistor T2 may be uniform (or substantially uniform) for each sub-pixel SP.

Therefore, the sensing voltage Vsen of the sensing line SEL may have the voltage different from the differential voltage Vref-Vth between the sensing data voltage Vref of the gate electrode of the first transistor T1 and the threshold voltage Vth due to the leakage current caused by the second transistor T2, but an error due to the second transistor T2 may be predicted. Accordingly, it is possible to prevent an error from occurring in the sensing voltage of the sensing line SEL due to leakage current caused by the light emitting elements EL2 and EL4 arranged in the reverse direction.

Third, during the third period t3', the first switch SW1 may be turned-on, and the second transistor T2, the third transistor T3, the fourth transistor T4, and the second switch SW2 may be turned-off.

Figure 11:
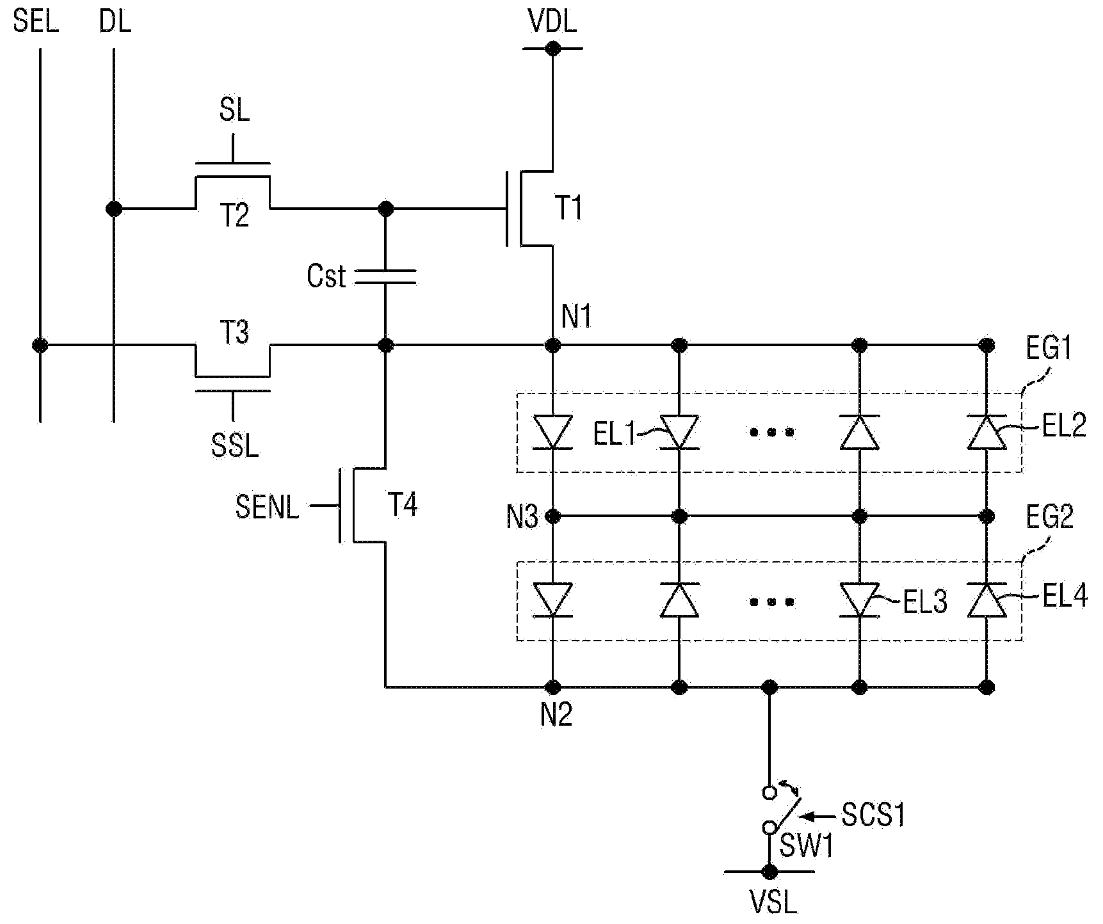
FIG. 11 is a circuit diagram illustrating a sub-pixel according to one or more embodiments.

FIG. 11 is a circuit diagram illustrating a sub-pixel according to one or more embodiments.

The embodiment of FIG. 11 is different from the embodiment of FIG. 6 in that the second switch SW2 is deleted.

Referring to FIG. 11, because the second switch SW2 is deleted, the third power voltage may not be applied to the second node N2 during the first period t1' and the second period t2' of the sensing mode. However, regardless of the deletion of the second switch SW2, the first node N1 and the second node N2 may have substantially the same electric potential due to the turn-on of the second transistor T2. Therefore, the driving current Ids of the first transistor T1 may not leak to the second node N2 through the first light emitting elements EU and the third light emitting elements EL3.

In addition, because the driving current Ids of the first transistor T1 flowing to the second node N2 through the second transistor T2 may be uniform for each sub-pixel. Therefore, the sensing voltage Vsen of the sensing line SEL may have the voltage different from the differential voltage Vref-Vth between the sensing data voltage Vref of the gate electrode of the first transistor T1 and the threshold voltage Vth due to the leakage current caused by the second transistor T2, but an error due to the second transistor T2 may be predicted. Accordingly, it is possible to prevent an error from occurring in the sensing voltage of the sensing line SEL due to leakage current caused by the light emitting elements EL2 and EL4 arranged in the reverse direction.

Figure 12:
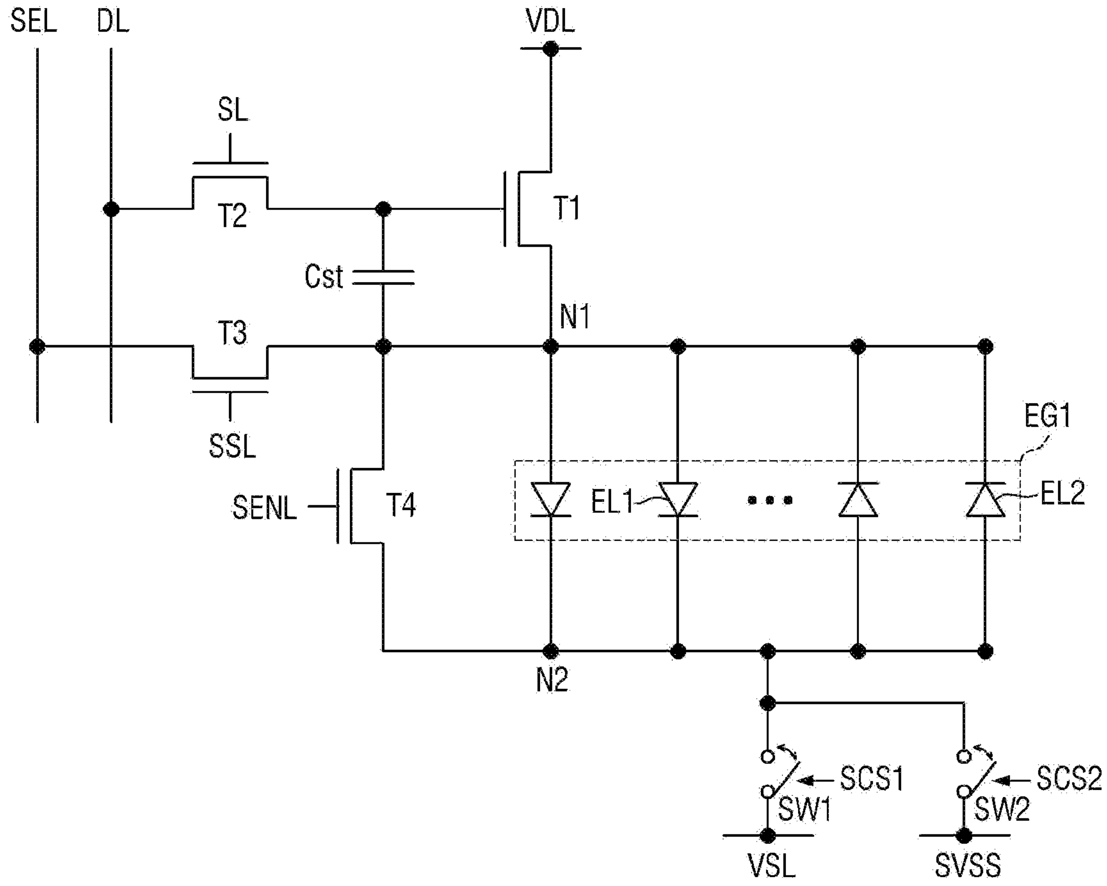
FIG. 12 is a circuit diagram illustrating a sub-pixel according to one or more embodiments.

FIG. 12 is a circuit diagram illustrating a sub-pixel according to one or more embodiments.

The embodiment of FIG. 12 is different from the embodiment of FIG. 6 in that the second light emitting element group EG2 is deleted.

Referring to FIG. 12, the plurality of light emitting elements EL1 and EL2 may include a first light emitting element group EG1 including the first light emitting elements EL1 and the second light emitting elements EL2, and may not include a second light emitting element group EG2 including the third light emitting elements EL3 and the fourth light emitting elements EL4.

The first light emitting elements EL1 are connected between the first node N1 and the second node N2 in the forward direction, and the second light emitting elements EL2 are connected between the first node N1 and the second node N2 in the reverse direction.

That is, in FIG. 6, from among the plurality of light emitting elements EL1, EL2, EL3, and EL4, the first light emitting elements EL1 and the third light emitting elements EL3 may have a two-series structure connected to each other in series, and the second light emitting elements EL2 and the fourth light emitting elements EL4 may have a two-series structure connected to each other in series. In FIG. 12, the plurality of light emitting elements EL1 and EL2 may not have a series connection structure.

Figure 13:
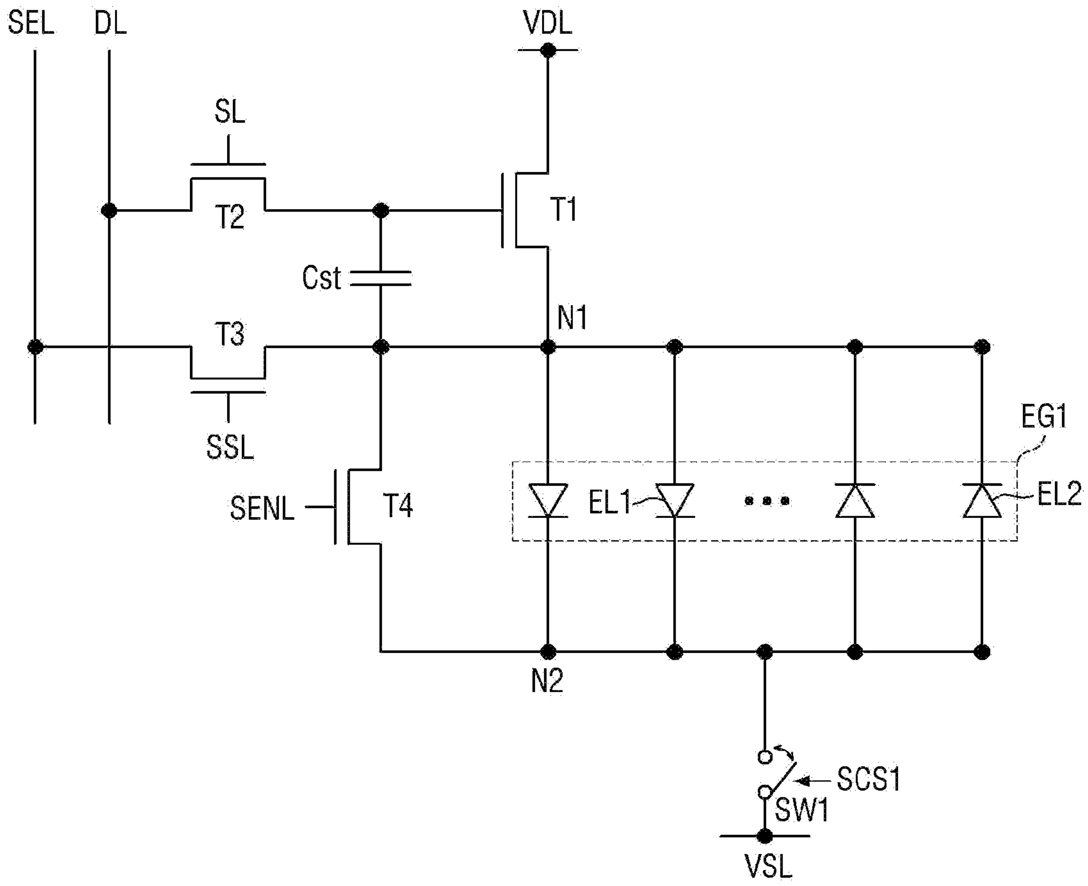
FIG. 13 is a circuit diagram illustrating a sub-pixel according to one or more embodiments.

FIG. 13 is a circuit diagram illustrating a sub-pixel according to one or more embodiments.

The embodiment of FIG. 13 is different from the embodiment of FIG. 12 in that the second switch SW2 is deleted.

Referring to FIG. 13, because the second switch SW2 is deleted, the third power voltage may not be applied to the second node N2 during the first period t1' and the second period t2' of the sensing mode. However, regardless of the deletion of the second switch SW2, the first node N1 and the second node N2 may have substantially the same electric potential due to the turn-on of the second transistor T2. Therefore, the driving current Ids of the first transistor T1 may not leak to the second node N2 through the first light emitting elements EU.

In addition, the driving current Ids of the first transistor T1 flowing to the second node N2 through the first light emitting element EL1 may be uniform for each sub-pixel SP. Therefore, the sensing voltage Vsen of the sensing line SEL may have the voltage different from the differential voltage Vref-Vth between the sensing data voltage Vref of the gate electrode of the first transistor T1 and the threshold voltage Vth due to the leakage current caused by the second transistor T2, but an error due to the second transistor T2 may be predicted. Accordingly, it is possible to prevent an error from occurring in the sensing voltage of the sensing line SEL due to leakage current caused by the light emitting elements EL2 and EL4 arranged in the reverse direction.

Figure 14:
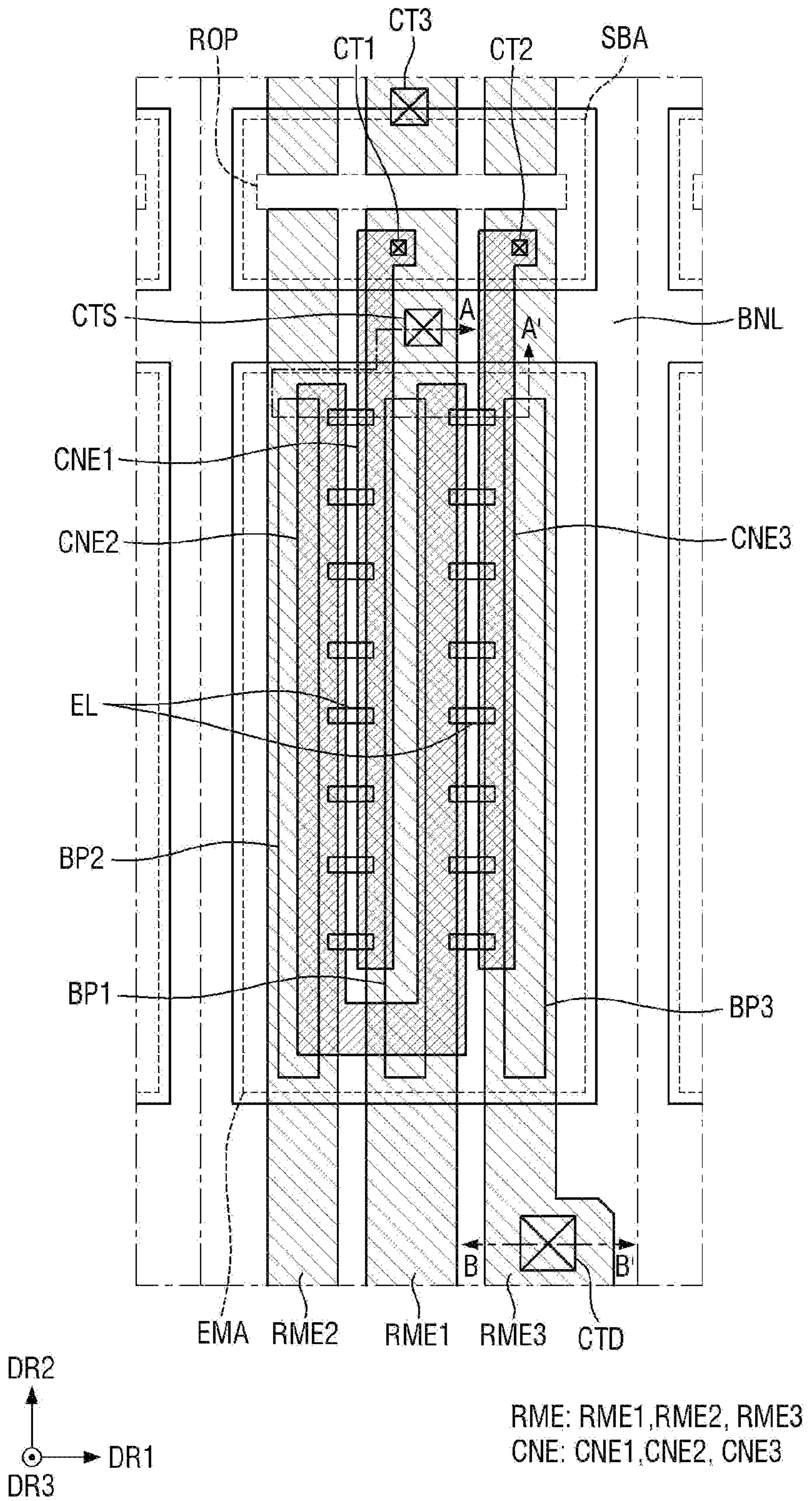
FIG. 14 is a layout diagram illustrating a sub-pixel according to one or more embodiments.
Figure 15:
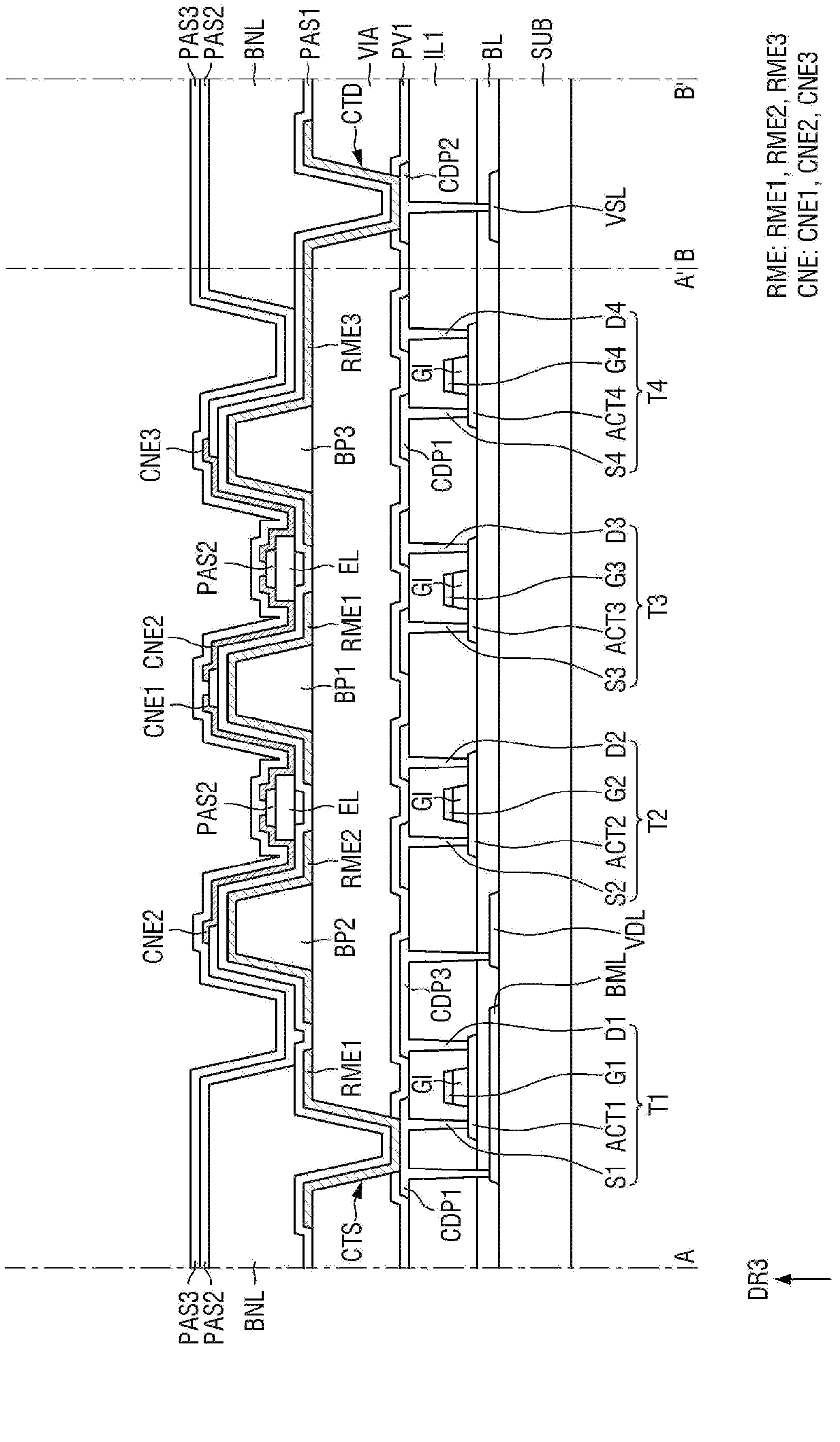
FIG. 15 is a cross-sectional view illustrating an example of a display panel taken along the lines A-A' and B-B' of FIG. 14.

FIG. 14 is a layout diagram illustrating a sub-pixel according to one or more embodiments. FIG. 15 is a cross-sectional view illustrating an example of a display panel taken along the lines A-A' and B-B' of FIG. 14.

Referring to FIGS. 14 to 15, a substrate SUB may be an insulating substrate. The substrate SUB may be made of an insulating material such as glass, quartz, or polymer resin. In addition, the substrate SUB may be a rigid substrate, but may also be a flexible substrate capable of bending, folding, rolling, or the like. The substrate SUB may include a light-emitting area EMA and a sub-area SBA that is a part of the non light-emitting area.

A first conductive layer may be disposed on the substrate SUB. The first conductive layer may include a bottom metal layer BML, a first power supply line VDL, and a second power supply line VSL. The bottom metal layer BML is disposed to overlap an active layer ACT1 of the first transistor T1 in a thickness direction of the substrate SUB (e.g., a third direction DR3). The bottom metal layer BML may prevent light from being incident on the first active layer ACT1 of the first transistor T1 or is electrically connected to the first active layer ACT1 to stabilize the electrical characteristics of the first transistor T1. However, the bottom metal layer BML may be omitted.

A buffer layer BL may be disposed on the first conductive layer and the substrate SUB. The buffer layer BL is formed on the substrate SUB to protect the transistors of the pixel PX from moisture penetrating through the substrate SUB, which is vulnerable to moisture permeation, and may perform a surface planarization function.

A semiconductor layer is disposed on the buffer layer BL. The semiconductor layer may include the first active layer ACT1 of the first transistor T1, a second active layer ACT2 of the second transistor T2, a third active layer ACT3 of the third transistor T3, and a fourth active layer ACT4 of the fourth transistor T4. The first active layer ACT1, the second active layer ACT2, the third active layer ACT3, and the fourth active layer ACT4 may be disposed to partially overlap a first gate electrode G1, a second gate electrode G2, a third gate electrode G3, and a fourth gate electrode G4 of a second conductive layer in the third direction DR3.

The semiconductor layer may include polycrystalline silicon, single crystal silicon, an oxide semiconductor, or the like. In one or more embodiments, the semiconductor layer may include polycrystalline silicon. The oxide semiconductor may be an oxide semiconductor containing indium (In). For example, the oxide semiconductor may be at least one of Indium Tin Oxide (ITO), Indium Zinc Oxide (IZO), Indium Gallium Oxide (IGO), Indium Zinc Tin Oxide (IZTO), Indium Gallium Tin Oxide (Indium Gallium Tin Oxide, IGTO), Indium Gallium Zinc Oxide (IGZO), and Indium Gallium Zinc Tin Oxide (IGZTO).

A first gate insulating layer GI is disposed on the semiconductor layer. FIG. illustrates the first gate insulating layer GI is patterned together with the gate electrodes G1, G2, G3, and G4 of the second conductive layer to be described later and is partially disposed between the second conductive layer and the active layers ACT1, ACT2, ACT3, and ACT4 of the semiconductor layer, but is not limited thereto. In one or more embodiments, the first gate insulating layer GI may be entirely disposed on the buffer layer BL.

The second conductive layer is disposed on the first gate insulating layer GI. The second conductive layer may include the first gate electrode G1 of the first transistor T1, the second gate electrode G2 of the second transistor T2, the third gate electrode G3 of the third transistor T3, and the fourth gate electrode G4 of the fourth transistor T4. The first gate electrode G1 may be disposed to overlap a channel area of the first active layer ACT1 in the third direction DR3, which is the thickness direction of the substrate SUB, and the second gate electrode G2 may be disposed to overlap a channel area of the second active layer ACT2 in the third direction DR3. The third gate electrode G3 may be disposed to overlap a channel area of the third active layer ACT3 in the third direction DR3, and the fourth gate electrode G4 may be disposed to overlap a channel area of the fourth active layer ACT4 in the third direction DR3. The second conductive layer may further include one electrode of the capacitor (e.g., capacitor Cst).

A first interlayer insulating layer IL1 is disposed on the second conductive layer and the buffer layer BL. The first interlayer insulating layer IL1 may function as an insulating layer between the second conductive layer and other layers disposed thereon and may protect the second conductive layer.

A third conductive layer is disposed on the first interlayer insulating layer IL1. The third conductive layer may include a plurality of conductive patterns CDP1, CDP2, and CDP3 and source electrodes S1, S2, S3, and S4 and drain electrodes D1, D2, D3, and D4 of each of the transistors T1, T2, T3, and T4. Some of the conductive patterns CDP1, CDP2, and CDP3 electrically connect conductive layers or semiconductor layers of different layers to each other and may serve as source or drain electrodes of each of the transistors T1, T2, T3, and T4.

A first conductive pattern CDP1 may contact the first active layer ACT1 of the first transistor T1 through a contact hole penetrating the first interlayer insulating layer IL1. The first conductive pattern CDP1 may contact the bottom metal layer BML through the contact hole penetrating the first interlayer insulating layer IL1 and the buffer layer BL. The first conductive pattern CDP1 may serve as a first source electrode S1 of the first transistor T1. The first conductive pattern CDP1 may be connected to a first alignment electrode RME1.

A second conductive pattern CDP2 may contact the first power supply line VSL through the contact hole penetrating the first interlayer insulating layer IL1 and the buffer layer BL. The second conductive pattern CDP2 may be connected to a third alignment electrode RME3.

A third conductive pattern CDP3 may contact the second power supply line VDL through the contact hole penetrating the first interlayer insulating layer IL1 and the buffer layer BL. Also, the third conductive pattern CDP3 may contact the first active layer ACT1 of the first transistor T1 through the contact hole penetrating the first interlayer insulating layer IL1. The third conductive pattern CDP3 may serve as the first drain electrode D1 of the first transistor T1.

A second source electrode S2 and a second drain electrode D2 may contact the second active layer ACT2 of the second transistor T2 through respective contact holes penetrating the first interlayer insulating layer IL1. A third source electrode S3 and a third drain electrode D3 may contact the third active layer ACT3 of the third transistor T3 through respective contact holes penetrating the first interlayer insulating layer IL1. A fourth source electrode S4 and a fourth drain electrode D4 may contact the fourth active layer ACT4 of the fourth transistor T4 through respective contact holes penetrating the first interlayer insulating layer IL1.

A first passivation layer PV1 is disposed on the third conductive layer. The first passivation layer PV1 may function as an insulating layer between other layers of the third conductive layer and may protect the third conductive layer.

The above-described buffer layer BL, the first gate insulating layer GI, the first interlayer insulating layer IL1, and the first protective layer PV1 may be formed of a plurality of inorganic layers that are alternately stacked. For example, the buffer layer BL, the first gate insulating layer GI, the first interlayer insulating layer IL1, and the first passivation layer PV1 may be formed as a double layer in which an inorganic layer including at least one of Silicon Oxide (SiOx), Silicon Nitride (SiNx), Silicon Oxynitride (SiOxNy) is stacked, or a multilayer in which these are alternately stacked. However, the present disclosure is not limited thereto, and the buffer layer BL, the first gate insulating layer GI, the first interlayer insulating layer IL1, and the first protective layer PV1 may be formed of one inorganic layer including the above-described insulating material. Also, in some embodiments, the first interlayer insulating layer IL1 may be formed of an organic insulating material such as polyimide (PI).

A via layer VIA is disposed on the third conductive layer in a display area DPA. The via layer VIA may include an organic insulating material, for example, an organic insulating material such as polyimide (PI) and may have a flat top surface while compensating for a step caused by the bottom conductive layers. However, in some embodiments, the via layer VIA may be omitted.

A first bank pattern BP1 may be disposed in the center of the light-emitting area EMA, a second bank pattern BP2 may be disposed on the left side of the light-emitting area EMA, and a third bank pattern BP3 may be disposed on the right side of the light-emitting area EMA. The plurality of light emitting elements EL may be disposed between the first and second bank patterns BP1 and BP2 and between the first and third bank patterns BP1 and BP3. The first to third bank patterns BP1, BP2, and BP3 may have the same length in the second direction DR2 (Y-axis direction) and different length in the first direction DR1 (X-axis direction) but the present disclosure is not limited thereto. The first to third bank patterns BP1, BP2, and BP3 may be disposed in an island-shaped pattern in the light-emitting area EMA.

The first to third bank patterns BP1, BP2, and BP3 may be disposed on the via layer VIA. Each of the first to third bank patterns BP1, BP2, and BP3 may protrude in an upper direction or the third direction DR3 (Z-axis direction) on the via layer VIA. Each of the first to third bank patterns BP1, BP2, and BP3 may have an inclined side surface.

The first alignment electrode RME1 may be extended in the second direction DR2 (Y-axis direction) from the center of the light-emitting area EMA. The first alignment electrode RME1 may cover an upper surface and an inclined side surface of the first bank pattern BP1. Accordingly, the first alignment electrode RME1 may reflect light emitted from the plurality of light emitting elements EL in the upper direction or the third direction DR3 (Z-axis direction).

A second alignment electrode RME2 may be extended in the second direction DR2 (Y-axis direction) from the left side of the light-emitting area EMA. The second alignment electrode RME2 may cover an upper surface and an inclined side surface of the second bank pattern BP2. Accordingly, the second alignment electrode RME2 may reflect the light emitted from the plurality of light emitting elements EL disposed between the first and second bank patterns BP1 and BP2 in the upper direction or the third direction DR3 (Z-axis direction).

The third alignment electrode RME3 may be extended in the second direction DR2 (Y-axis direction) from the right side of the light-emitting area EMA. The third alignment electrode RME3 may cover an upper surface and an inclined side surface of the third bank pattern BP3. Accordingly, the third alignment electrode RME3 may reflect the light emitted from the plurality of light emitting elements EL disposed between the first and third bank patterns BP1 and BP3 in the upper direction or the third direction DR3 (Z-axis direction).

One end of the first to third alignment electrodes RME1, RME2, and RME3 may be separated by a separator ROP. The first to third alignment electrodes RME1, RME2, and RME3 may be alignment electrodes that align the plurality of light emitting elements EL during the manufacturing process of the display device 10. During the manufacturing process of the display device 10, the first alignment electrode RME1 may be connected to the second power supply line VDL through a third contact hole CT3 to receive the second power voltage. Accordingly, the first to third alignment electrodes RME1, RME2, and RME3 may be separated by a separation unit ROP after alignment of the plurality of light emitting elements EL is completed.

The first to third alignment electrodes RME1, RME2, and RME3 may be disposed on the via layer VIA and the first to third bank patterns BP1, BP2, and BP3.

The first alignment electrode RME1 may be connected to the first conductive pattern CDP1 through a first electrode contact hole CTS penetrating the via layer VIA and the first protective layer PV1, thereby being electrically connected to the first electrode S1 of the first transistor T1.

The third alignment electrode RME3 may be connected to the second conductive pattern CDP2 through a second electrode contact hole CTD penetrating the via layer VIA and the first protective layer PV1, and thus may be electrically connected to the first power supply line VSL. Therefore, the third alignment electrode RME3 may receive the second power voltage of the first power supply line VSL.

The first and third alignment electrodes RME1 and RME3 are electrically connected to the light emitting element EL to reflect the light emitted from the plurality of light emitting elements EL in the upper direction of the substrate SUB (e.g., the third direction DR3). The first to third alignment electrodes RME1, RME2, and RME3 may include a conductive material having high reflectance. For example, the first to third alignment electrodes RME1, RME2, and RME3 may include a metal such as silver (Ag), copper (Cu), aluminum (Al), or the like, or may have a structure in which an alloy including aluminum (Al), nickel (Ni), lanthanum (La), or the like, or a metal layer such as titanium (Ti), molybdenum (Mo), and niobium (Nb) and the alloy are laminated. In one or more embodiments, the first to third alignment electrodes RME1, RME2, and RME3 may be formed of a double layer or a multilayer in which at least one metal layer is stacked made of an alloy containing aluminum (Al) and titanium (Ti), molybdenum (Mo), and niobium (Nb).

Alternatively, the first to third alignment electrodes RME1, RME2, and RME3 may further include a transparent conductive material. For example, the first to third alignment electrodes RME1, RME2, and RME3 may include a material such as ITO, IZO, or ITZO. In one or more embodiments, each of the alignment electrodes RME may have a structure in which a transparent conductive material and a metal layer having high reflectivity are stacked in one or more layers, or may be formed as a single layer including them. For example, the first to third alignment electrodes RME1, RME2, and RME3 may have a stacked structure such as ITO/Ag/ITO/, ITO/Ag/IZO, or ITO/Ag/ITZO/IZO.

The plurality of light emitting elements EL may be aligned between the first alignment electrode RME1 and the second alignment electrode RME2 or between the first alignment electrode RME1 and the third alignment electrode RME3. A first insulating layer PAS1 may cover the first to third alignment electrodes RME1, RME2, and RME3. The plurality of light emitting elements EL may be insulated from the first to third alignment electrodes RME1, RME2, and RME3 by the first insulating layer PAS1. Before the first to third alignment electrodes RME1, RME2, and RME3 are separated by the separation unit ROP, each of the first to third alignment electrodes RME1, RME2, RME3 may receive an alignment signal. Thereby, an electric field may be formed between the first to third alignment electrodes RME1, RME2, and RME3. For example, the plurality of light emitting elements EL may be sprayed onto the first to third alignment electrodes RME1, RME2, and RME3 through an inkjet printing process, and a plurality of light emitting elements EL dispersed in ink may be aligned by receiving a dielectrophoresis force by an electric field formed between the first to third alignment electrodes RME1, RME2, and RME3. Accordingly, the plurality of light emitting elements EL may be disposed along the second direction DR2 (Y-axis) between the first alignment electrode RME1 and the second alignment electrode RME2 and between the first alignment electrode RME1 and the third alignment electrode RME3.

Specifically, as shown in FIG. 6, from among the plurality of light emitting elements EL, the first light emitting elements EL1 may be aligned in the forward direction between the first alignment electrode RME1 and the second alignment electrode RME2, and the second light emitting elements EL2 may be aligned in the reverse direction between the first alignment electrode RME1 and the second alignment electrode RME2. For example, the first electrode of each of the first light emitting elements EL1 may be connected to the first contact electrode CNE1 which is connected to the first alignment electrode RME1, and the second electrode may be connected to the second contact electrode CNE2. Also, the first electrode of each of the second light emitting elements EL2 may be connected to the second contact electrode CNE2, and the second electrode may be connected to the first contact electrode CNE1. That is, the first contact electrode CNE1 may correspond to the first node N1 of FIG. 6, and the second contact electrode CNE2 may correspond to the third node N3 of FIG. 6.

In addition, the third light emitting elements EL3 may be aligned in the forward direction between the first alignment electrode RME1 and the third alignment electrode RME3, and the fourth light emitting elements EL4 may be aligned in the reverse direction between the first alignment electrode RME1 and the third alignment electrode RME3. For example, the first electrode of each of the third light emitting elements EL3 may be connected to the second contact electrode CNE2, and the second electrode may be connected to the third contact electrode CNE3. Also, the first electrode of each of the fourth light emitting elements EL4 may be connected to the third contact electrode CNE3, and the second electrode may be connected to the second contact electrode CNE2. That is, the third contact electrode CNE3 may correspond to the second node N2 of FIG. 6.

The first insulating layer PAS1 may be disposed on the via layer VIA and the first to third alignment electrodes RME1, RME2, and RME3. The first insulating layer PAS1 may include the insulating material to protect the first to third alignment electrodes RME1, RME2, and RME3. The first insulating layer PAS1 is disposed to cover the first to third alignment electrodes RME1, RME2, and RME3 before the bank layer BNL is formed, so that damage to the first to third alignment electrodes RME1, RME2, and RME3 may be prevented in the process of forming the bank layer BNL. Also, the first insulating layer PAS1 may prevent the plurality of light emitting elements EL from being damaged by direct contact with other members.

The first to third contact electrodes CNE1, CNE2, and CNE3 may be disposed on the first to third alignment electrodes RME1, RME2, and RME3. The second insulating layer PAS2 may be disposed on the bank layer BNL, the first insulating layer PAS1, and the central portion of each of the plurality of light emitting elements EL. The third insulating layer PAS3 may cover the second insulating layer PAS2 and the first to third connection electrodes CNE1, CNE2, and CNE3. The second and third insulating layers PAS2 and PAS3 may insulate each of the first to third connection electrodes CNE1, CNE2, and CNE3.

The first connection electrode CNE1 may be disposed on the first alignment electrode RME1 and may be connected to the first alignment electrode RME1 through a first contact hole CT1 penetrating the first insulating layer PAS1. The first connection electrode CNE1 may connect one end of the light emitting elements EL disposed between the first bank pattern BP1 and the second bank pattern BP2 and the first alignment electrode RME1.

The second connection electrode CNE2 may be disposed on the first and second alignment electrodes RME1 and RME2, and may be insulated from the first and second alignment electrodes RME1 and RME2. The first portion of the second connection electrode CNE2 may be disposed on the second alignment electrode RME2 and may be extended in the second direction DR2 (the Y-axis direction). The second portion of the second connection electrode CNE2 may be bent from a lower side of the first portion and may be extended in the first direction DR1 (X-axis direction). The third portion of the second connection electrode CNE2 may be bent from the right side of the second portion to extend in the second direction DR2 (Y-axis direction), and may be disposed on the first alignment electrode RME1. The second connection electrode CNE2 may connect the other end of the light emitting elements EL disposed between the first bank pattern BP1 and the second bank pattern BP2 to one end of the light emitting elements EL disposed between the first bank pattern BP1 and the third bank pattern BP3.

The third connection electrode CNE3 may be disposed on the third alignment electrode RME3 and may be connected to the third alignment electrode RME3 through the second contact hole CT2 penetrating the first insulating layer PAS1. The third connection electrode CNE3 may connect the other end of the light emitting elements EL disposed between the first bank pattern BP1 and the third bank pattern BP3 to the third alignment electrode RME3.

Figure 16:
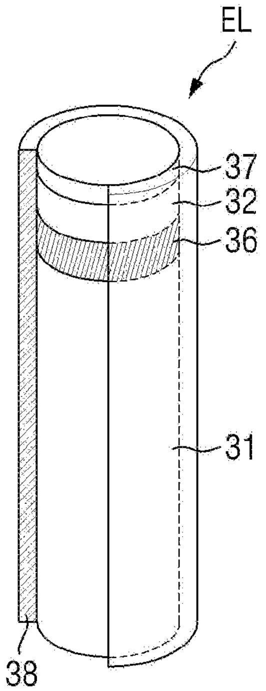
FIG. 16 is a cutaway view illustrating a light emitting element according to one or more embodiments.

FIG. 16 is an example cutaway view illustrating a light emitting element according to one or more embodiments.

Referring to FIG. 16, the light emitting element EL may be the light emitting diode, and specifically, the light emitting element EL which has a size of nanometers to micrometers may be the inorganic light emitting diode made of an inorganic material. The light emitting element EL may be aligned between the two electrodes in which polarities are formed when an electric field is formed in a specific direction between the two electrodes facing (e.g., opposing) each other.

The light emitting element EL according to one or more embodiments may have a shape extending in one direction. The light emitting element EL may have a shape such as a cylinder, a rod, a wire, or a tube. However, the shape of the light emitting element EL is not limited thereto, and the light emitting element EL may have various shapes such as having a polygonal prism shape, such as a cube, a rectangular parallelepiped, or a hexagonal prism shape, or having an outer surface extending in one direction partially inclined.

The light emitting element EL may include a semiconductor layer doped with an arbitrary conductivity type (e.g., p-type or n-type) dopant. The semiconductor layer may emit an electric signal applied from an external power supply source to emit light in a specific wavelength band. The light emitting element EL may include a first semiconductor layer 31, a second semiconductor layer 32, a light emitting layer 36, an electrode layer 37, and an insulating film 38.

The first semiconductor layer 31 may be an n-type semiconductor. The first semiconductor layer 31 may include a semiconductor material having a chemical formula of $Al_xGa_yIn_{1-x-y}N$ ($0 \le x \le 1$, $0 \le y \le 1$, $0 \le x+y \le 1$). For example, the first semiconductor layer 31 may be any one or more of AlGaInN, GaN, AlGaN, InGaN, AlN, and InN doped with an n-type dopant. The n-type dopant doped in the first semiconductor layer 31 may be Si, Ge, Sn, Se, or the like.

The second semiconductor layer 32 is disposed on the first semiconductor layer 31 with the light emitting layer 36 interposed therebetween. The second semiconductor layer 32 may be a p-type semiconductor and may include a semiconductor material having the formula $Al_xGa_yIn_{1-x-y}N$ ($0 \le x \le 1$, $0 \le y \le 1$, $0 \le x+y \le 1$). For example, the second semiconductor layer 32 may be at least one of AlGaInN, GaN, AlGaN, InGaN, AlN, and InN doped with a p-type dopant. The p-type dopant doped in the second semiconductor layer 32 may be Mg, Zn, Ca, Ba, or the like.

Although the drawing shows that the first semiconductor layer 31 and the second semiconductor layer 32 are configured as one layer, the present disclosure is not limited thereto. Depending on the material of the light emitting layer 36, the first semiconductor layer 31 and the second semiconductor layer 32 may further include a larger number of layers, for example, a clad layer or a TSBR (Tensile strain barrier reducing) layer. For example, the light emitting element EL may further include another semiconductor layer disposed between the first semiconductor layer 31 and the light emitting layer 36 or between the second semiconductor layer 32 and the light emitting layer 36. The semiconductor layer disposed between the first semiconductor layer 31 and the light emitting layer 36 may be at least one of AlGaInN, GaN, AlGaN, InGaN, AlN, InN and SLs doped with the n-type dopant, and the semiconductor layer disposed between the second semiconductor layer 32 and the light emitting layer 36 may be at least one of AlGaInN, GaN, AlGaN, InGaN, AlN, and InN doped with the p-type dopant.

The light emitting layer 36 is disposed between the first semiconductor layer 31 and the second semiconductor layer 32. The light emitting layer 36 may include a material having a single or multiple quantum well structure. When the light emitting layer 36 includes a material having a multi-quantum well structure, it may have a structure in which quantum layers and well layers are alternately stacked. The light emitting layer 36 may emit light by combining electron-hole pairs according to an electric signal applied through the first semiconductor layer 31 and the second semiconductor layer 32. The light emitting layer 36 may include a material such as AlGaN, AlGaInN, or InGaN. Especially, when the light emitting layer 36 has a multi-quantum well structure in which quantum layers and well layers are alternately stacked, the quantum layer may include a material such as AlGaN or AlGaInN and the well layer may include a material such as GaN or AlInN.

The light emitting layer 36 may be a structure in which a type of semiconductor material having a large band gap energy and a semiconductor material having a small band gap energy are alternately stacked, and may include a Group III to V semiconductor material that is different according to the wavelength band of the emitted light. The light emitted by the light emitting layer 36 is not limited to the light of the blue wavelength band, and the light of the red and green wavelength bands may be emitted in some cases.

The electrode layer 37 may be an ohmic connection electrode. However, the present disclosure is not limited thereto, and may be a Schottky connection electrode. The light emitting element EL may include at least one electrode layer 37. The light emitting element EL may include one or more electrode layers 37, but the present disclosure is not limited thereto and the electrode layer 37 may be omitted.

The electrode layer 37 may reduce resistance between the light emitting element EL and the electrode or the connection electrode when the light emitting element EL is electrically connected to an electrode or a connection electrode in the display device 10. The electrode layer 37 may include a conductive metal. For example, the electrode layer 37 may include at least one of aluminum (Al), titanium (Ti), indium (In), gold (Au), silver (Ag), ITO, IZO, and ITZO.

The insulating film 38 is disposed to be around (e.g., to surround) the outer surfaces (e.g., the outer peripheral or circumferential surfaces) of the plurality of semiconductor layers 31, 32, and the electrode layers 37 described above. For example, the insulating film 38 may be disposed to be around (e.g., to surround) at least the outer surface (e.g., the outer peripheral or circumferential surface) of the light emitting layer 36, and both ends of the light emitting element EL in the longitudinal direction may be exposed. In addition, the insulating film 38 may be formed to have a round top surface in cross-section in a area adjacent to at least one end of the light emitting element EL.

The insulating film 38 may include at least one material having insulating properties, for example, silicon oxide (SiOx), silicon nitride (SiNx), silicon oxynitride (SiOxNy), aluminum nitride (AlNx), aluminum oxide (AlOx), zirconium oxide (ZrOx), hafnium oxide (HfOx), and titanium oxide (TiOx). Although the drawing illustrates that the insulating film 38 is formed as a single layer, the present disclosure is not limited thereto. In one or more embodiments, the insulating film 38 may be formed in a multi-layered structure in which a plurality of layers are stacked.

The insulating film 38 may function to protect the semiconductor layers and the electrode layer of the light emitting element EL. The insulating film 38 may prevent an electrical short that may occur in the light emitting layer 36 when the light emitting element EL directly contacts an electrode through which an electrical signal is transmitted. In addition, the insulating film 38 may prevent a decrease in the luminous efficiency of the light emitting element EL.

In addition, the outer surface (e.g., the outer peripheral or circumferential surface) of the insulating film 38 may be surface-treated. The light emitting element EL may be sprayed onto the electrode while being dispersed in ink (e.g., a predetermined ink) to be aligned. Here, the surface of the insulating film 38 may be treated with hydrophobicity or hydrophilicity to maintain the light emitting element EL in a dispersed state without being agglomerated with other light emitting elements EL adjacent in the ink.

Figure 17:
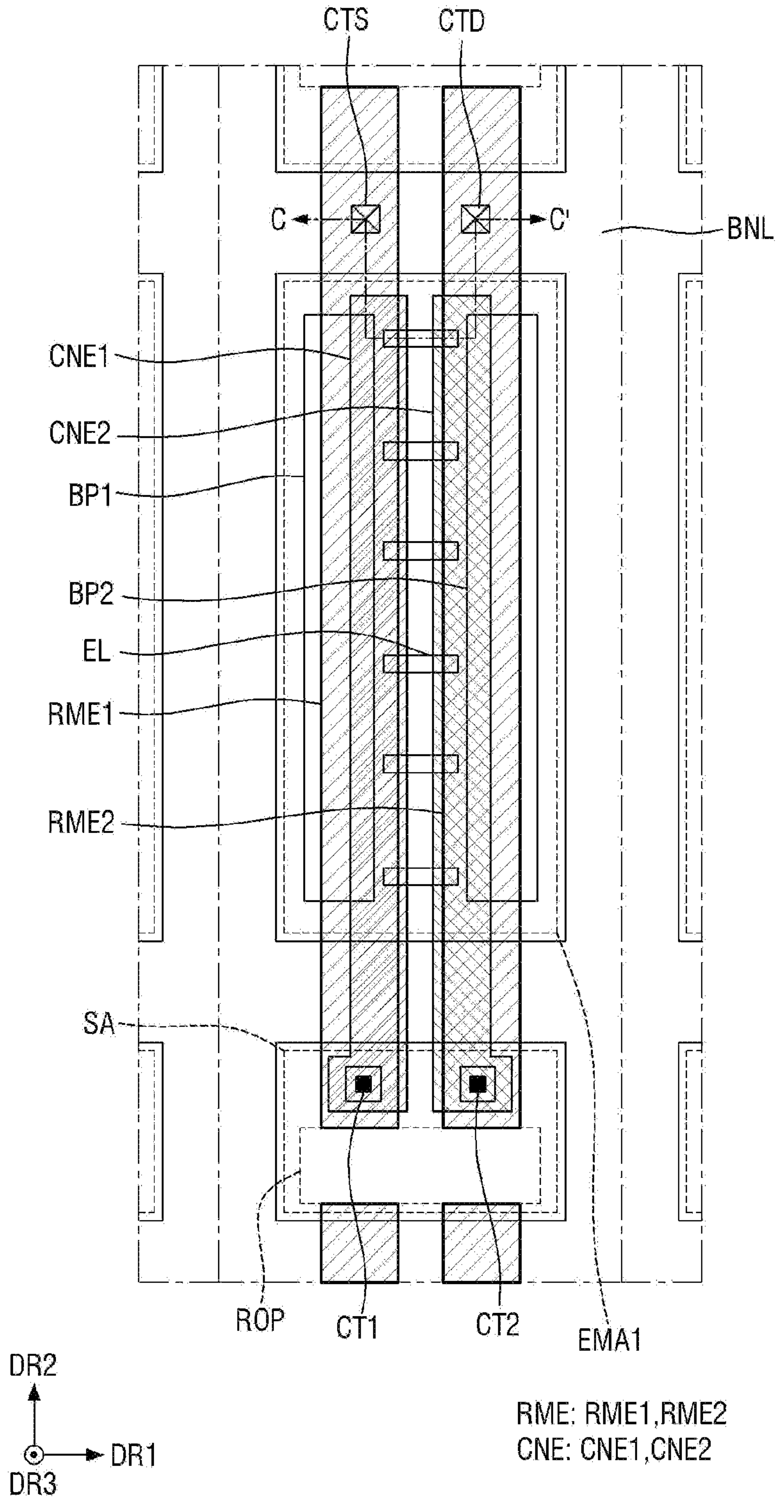
FIG. 17 is a layout diagram illustrating a sub-pixel according to one or more embodiments.
Figure 18:
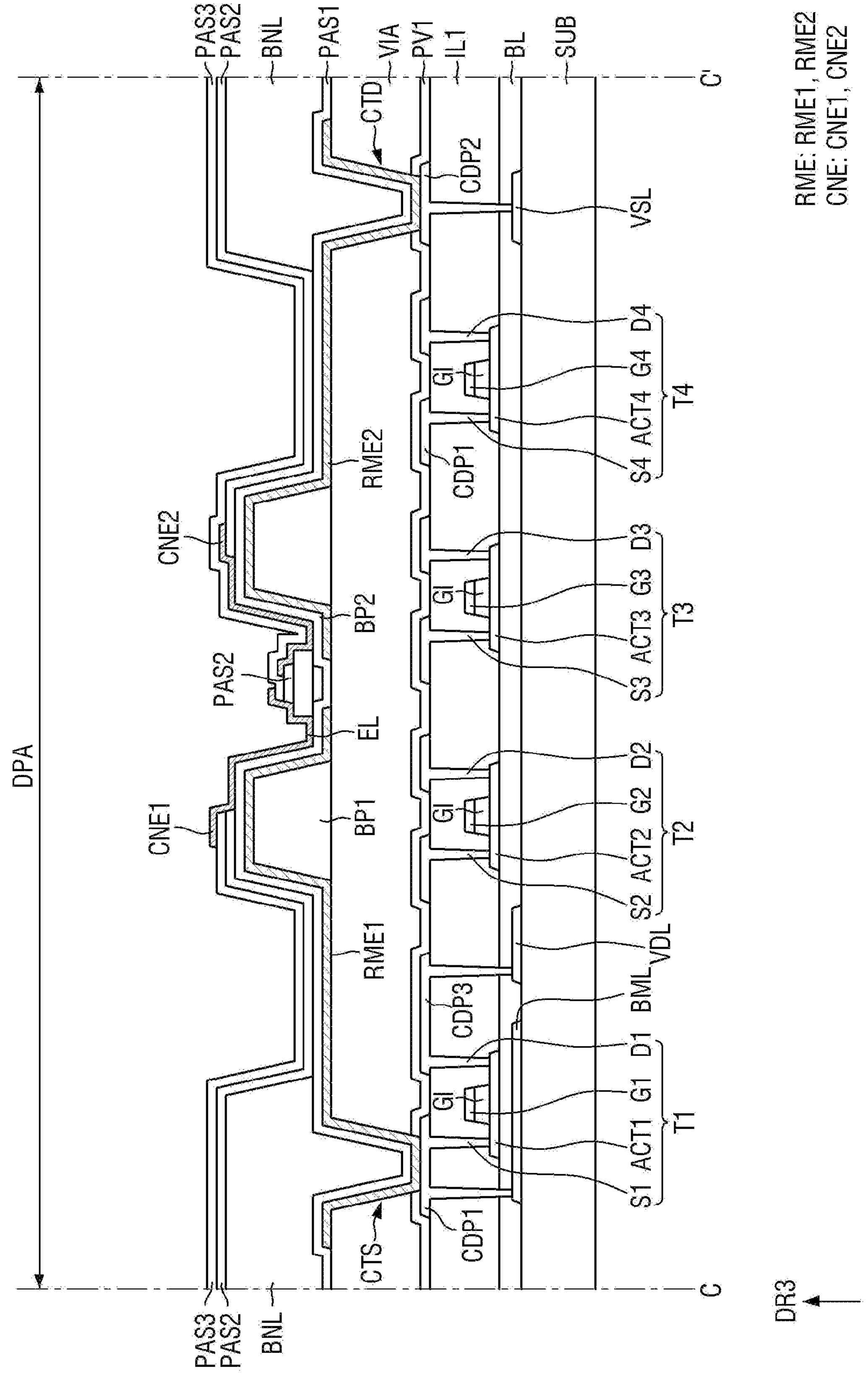
FIG. 18 is a cross-sectional view illustrating an example of the display panel taken along line C-C' of FIG. 17.

FIG. 17 is a layout diagram illustrating a sub-pixel according to one or more embodiments. FIG. 18 is a cross-sectional view illustrating an example of the display panel taken along the line C-C' of FIG. 17.

The embodiments of FIGS. 17 and 18 are different from the embodiments of FIGS. 14 and 15 in that the third bank pattern BP3, the third alignment electrode RME3, and the third contact electrode CNE3 are omitted. In FIGS. 17 and 18, descriptions overlapping those of the embodiments of FIGS. 14 and 15 will be omitted.

Referring to FIGS. 17 and 18, the first alignment electrode RME1 and the second alignment electrode RME2 may be extended in the second direction DR2 (Y-axis direction) from the center of the emitting area EMA. The first alignment electrode RME1 may cover an upper surface and an inclined side surface of the first bank pattern BP1. The second alignment electrode RME2 may cover an upper surface and an inclined side surface of the second bank pattern BP2.

The first alignment electrode RME1 may be connected to the first conductive pattern CDP1 through the first electrode contact hole CTS, thereby being electrically connected to the first electrode S1 of the first transistor T1.

The second alignment electrode RME2 may be connected to the second conductive pattern CDP2 through the second electrode contact hole CTD, and thereby may be electrically connected to the first power supply line VSL. Therefore, the second alignment electrode RME2 may receive the second power voltage of the first power supply line VSL.

Among the plurality of light emitting elements EL, the first light emitting elements EL1 may be aligned in the forward direction between the first alignment electrode RME1 and the second alignment electrode RME2, and the second light emitting elements EL2 may be aligned in the reverse direction between the first alignment electrode RME1 and the second alignment electrode RME2. For example, the first electrode of each of the first light emitting elements EL1 may be connected to the first alignment electrode RME1, and the second electrode may be connected to the second alignment electrode RME2. Also, the first electrode of each of the second light emitting elements EL2 may be connected to the second alignment electrode RME2, and the second electrode may be connected to the first alignment electrode RME1. That is, the first alignment electrode RME1 may correspond to the first node N1 of FIG. 6, and the second alignment electrode RME2 may correspond to the second node N2 of FIG. 12.

The first connection electrode CNE1 may be extended in the second direction DR2. The first connection electrode CNE1 may be disposed on the first alignment electrode RME1 and may be connected to the first alignment electrode RME1 through the first contact hole CT1 penetrating the first insulating layer PAS1. The first connection electrode CNE1 may connect one end of the light emitting elements EL disposed between the first bank pattern BP1 and the second bank pattern BP2 to the first alignment electrode RME1. The first connection electrode CNE1 may be the anode electrode of the plurality of first light emitting element EL1, but is not limited thereto.

The second connection electrode CNE2 may be extended in the second direction DR2. The second connection electrode CNE2 may be disposed on the second alignment electrode RME2 and may be connected to the second alignment electrode RME2 through the second contact hole CT2 penetrating the first insulating layer PAS1. The second connection electrode CNE2 may connect the other end of the light emitting elements EL disposed between the first bank pattern BP1 and the second bank pattern BP2 to the second alignment electrode RME2.

It should be understood, however, that the aspects and features of embodiments of the present disclosure are not restricted to the one set forth herein. The above and other aspects of the present disclosure will become more apparent to one of ordinary skill in the art to which the present disclosure pertains by referencing the claims, with functional equivalents thereof to be included therein.

What is claimed is:

1. A display device comprising:

a scan line extending in a first direction;

a sensing scan line extending in the first direction and spaced apart from the scan line;

a data line extending in a second direction crossing the first direction;

a sensing line extending in the second direction and spaced apart from the data line;

a sensing enable signal line extending in the second direction and spaced apart from the data line and the sensing line; and a sub-pixel connected to the scan line, the sensing scan line, the data line, the sensing line, and the sensing enable signal line, wherein the sub-pixel comprises:

a plurality of light emitting elements between a first node and a second node;

a first transistor configured to supply a driving current to the first node according to a voltage of a gate electrode of the first transistor;

a second transistor configured to control a connection between the first node and the second node according to a sensing enable signal of the sensing enable signal line, a third transistor configured to supply a data voltage of the data line to the gate electrode of the first transistor according to a scan signal of the scan line; and a fourth transistor configured to supply an initialization voltage of the sensing line to the first node according to a sensing scan signal of the sensing scan line.

2. The display device of claim 1, wherein the plurality of light emitting elements comprises:

a first light emitting element comprising a first electrode connected to the first node and a second electrode connected to the second node; and a second light emitting element comprising a first electrode connected to the second node and a second electrode connected to the first node.

3. The display device of claim 1, wherein the plurality of light emitting elements comprises:

a first light emitting element comprising a first electrode connected to the first node and a second electrode connected to a third node;

a second light emitting element comprising a first electrode connected to the third node and a second electrode connected to the first node;

a third light emitting element comprising a first electrode connected to the third node and a second electrode connected to the second node; and a fourth light emitting element comprising a first electrode connected to the second node and a second electrode connected to the third node.

4. The display device of claim 1, further comprising a first switch configured to control a connection between a first power voltage and the second node according to a first switch control signal.

5. The display device of claim 4, wherein the first switch control signal is an inverted signal of the sensing enable signal.

6. The display device of claim 4, further comprising a second switch configured to control a connection between a sensing power voltage and the second node according to a second switch control signal.

7. The display device of claim 6, wherein the second switch control signal is a same as the sensing enable signal.

8. The display device of claim 6, wherein the sub-pixel further comprises:

a capacitor between the gate electrode of the first transistor and the first node.

9. The display device of claim 8, wherein one frame period in a display mode comprises a first period and a second period, wherein the scan signal and the sensing scan signal are generated as a first level voltage during the first period and are generated as a second level voltage during the second period, wherein the sensing enable signal and the second switch control signal are generated as the second level voltage during the first period and the second period, and wherein the first switch control signal is generated as the first level voltage during the first period and the second period.

10. The display device of claim 8, wherein a sensing mode comprises a first period, a second period, and a third period, wherein the scan signal and the sensing scan signal are generated as a first level voltage during the second period, and are generated as a second level voltage during the first period and the third period, wherein the sensing enable signal and the second switch control signal are generated as the first level voltage during the first period and the second period, and wherein the first switch control signal is generated as the second level voltage during the first period and the second period.

11. A display device comprising:

a display panel comprising a sub-pixel connected to a sensing enable signal line; and a circuit board connected to the display panel, wherein the sub-pixel comprises:

a plurality of light emitting elements between a first node and a second node;

a first transistor configured to supply a driving current to the first node according to a voltage of a gate electrode of the first transistor;

a second transistor configured to control a connection between the first node and the second node according to a sensing enable signal of the sensing enable signal line, a third transistor configured to supply a data voltage of a data line to the gate electrode of the first transistor according to a scan signal of a scan line; and a fourth transistor configured to supply an initialization voltage of a sensing line to the first node according to a sensing scan signal of a sensing scan line; and wherein the circuit board comprises a first switch configured to control a connection between a first power voltage and the second node according to a first switch control signal.

12. The display device of claim 11, wherein the first switch control signal is an inverted signal of the sensing enable signal.

13. The display device of claim 11, wherein the circuit board further comprises a second switch configured to control a connection between a sensing power voltage and the second node according to a second switch control signal.

14. The display device of claim 13, wherein the second switch control signal is a same as the sensing enable signal.

15. The display device of claim 13, wherein the sub-pixel further comprises:

a capacitor between the gate electrode of the first transistor and the first node.

16. The display device of claim 15, wherein one frame period in a display mode comprises a first period and a second period, wherein the scan signal and the sensing scan signal are generated as a first level voltage during the first period and are generated as a second level voltage during the second period, wherein the sensing enable signal and the second switch control signal are generated as the second level voltage during the first period and the second period, and wherein the first switch control signal is generated as the first level voltage during the first period and the second period.

17. The display device of claim 15, a sensing mode comprises a first period, a second period, and a third period, wherein the scan signal and the sensing scan signal are generated as a first level voltage during the second period, and are generated as a second level voltage during the first period and the third period, wherein the sensing enable signal and the second switch control signal are generated as the first level voltage during the first period and the second period, and wherein the first switch control signal is generated as the second level voltage during the first period and the second period.

18. A driving method of a display device comprising:

a plurality of sub-pixels connected to a scan line, a sensing scan line, a data line, a sensing line, and a sensing enable signal line and a plurality of light emitting elements located between a first node and a second node;

wherein a sub-pixel from among the plurality of sub-pixels comprising a first transistor for supplying a driving current to the first node according to a voltage of a gate electrode of the first transistor, a second transistor to supply a data voltage of the data line to the gate electrode of the first transistor according to a scan signal of the scan line; and a third transistor to supply an initialization voltage of the sensing line to the first node according to a sensing scan signal of the sensing scan line, the method comprising:

connecting the first node and the second node in a sensing mode in response to a sensing enable signal on the sensing enable signal line; and applying a reference voltage of the data line to the gate electrode of the first transistor in the sensing mode to supply the driving current of the first transistor to the sensing line according to the reference voltage.

19. The driving method of the display device of claim 18, further comprising applying a sensing power voltage to the first node in the sensing mode.

20. The driving method of the display device of claim 18, wherein the plurality of light emitting elements comprises:

a first light emitting element comprising a first electrode connected to the first node and a second electrode connected to the second node; and a second light emitting element comprising a first electrode connected to the second node and a second electrode connected to the first node.

* * * * *